US012469446B2

(12) United States Patent
Zhang et al.

(10) Patent No.: US 12,469,446 B2
(45) Date of Patent: Nov. 11, 2025

(54) PIXEL CIRCUIT AND DRIVING METHOD THEREOF, AND DISPLAY PANEL

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Jingwen Zhang, Beijing (CN); Miao Wang, Beijing (CN); Tiaomei Zhang, Beijing (CN); Yunsheng Xiao, Beijing (CN); Haigang Qing, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/257,940

(22) PCT Filed: May 31, 2022

(86) PCT No.: PCT/CN2022/096242
§ 371 (c)(1),
(2) Date: Jun. 16, 2023

(87) PCT Pub. No.: WO2023/230841
PCT Pub. Date: Dec. 7, 2023

(65) Prior Publication Data
US 2025/0078745 A1 Mar. 6, 2025

(51) Int. Cl.
*G09G 3/3233* (2016.01)
*G09G 3/3266* (2016.01)
*G09G 3/3275* (2016.01)

(52) U.S. Cl.
CPC ......... *G09G 3/3233* (2013.01); *G09G 3/3266* (2013.01); *G09G 3/3275* (2013.01);
(Continued)

(58) Field of Classification Search
CPC ............................................ G09G 3/32–3291
See application file for complete search history.

(56) References Cited

U.S. PATENT DOCUMENTS

| | | | | |
|---|---|---|---|---|
| 11,361,713 B1 * | 6/2022 | Fu | ........................ | G09G 3/3241 |
| 2016/0372037 A1 * | 12/2016 | Lim | ..................... | G09G 3/3233 |

(Continued)

FOREIGN PATENT DOCUMENTS

| | | |
|---|---|---|
| CN | 111754940 A | 10/2020 |
| CN | 111816119 A | 10/2020 |

(Continued)

OTHER PUBLICATIONS

Extended European Search Report for corresponding Application No. 22944178.7, Jan. 20, 2025, 15 pages.

*Primary Examiner* — Roberto W Flores
(74) *Attorney, Agent, or Firm* — Dority & Manning, P.A.

(57) ABSTRACT

A pixel circuit includes a driving sub-circuit coupled to a first node, a second node and a third node, a compensation sub-circuit coupled to the first node, the third node and a first scan signal terminal, an adjustment sub-circuit, and a writing sub-circuit. The compensation sub-circuit includes a first transistor group, and the first transistor group includes at least two first transistors connected in series. A fourth node is formed between a second electrode of a first first transistor and a first electrode of a second first transistor. The adjustment sub-circuit is coupled to the fourth node and at least one control terminal. The adjustment sub-circuit is configured to, in light-emitting phases, adjust a voltage of the fourth node under a control of a signal from the at least one control terminal, so as to reduce a voltage difference between the fourth node and the first node.

14 Claims, 9 Drawing Sheets

(52) U.S. Cl.
CPC ............... *G09G 2300/0819* (2013.01); *G09G 2300/0852* (2013.01); *G09G 2310/08* (2013.01); *G09G 2320/0247* (2013.01)

(56) References Cited

U.S. PATENT DOCUMENTS

| | | | | |
|---|---|---|---|---|
| 2017/0148379 | A1 | 5/2017 | Cho | |
| 2021/0090494 | A1 | 3/2021 | Hwang et al. | |
| 2021/0104196 | A1 | 4/2021 | Yuan | |
| 2021/0193049 | A1 | 6/2021 | Lin et al. | |
| 2021/0375201 | A1 | 12/2021 | Park et al. | |
| 2022/0020328 | A1 | 1/2022 | Lim et al. | |
| 2022/0044635 | A1 | 2/2022 | Roh et al. | |
| 2022/0069044 | A1 | 3/2022 | Kwak et al. | |
| 2022/0148508 | A1* | 5/2022 | Chi | G09G 3/3233 |
| 2022/0301507 | A1 | 9/2022 | Kuang et al. | |

FOREIGN PATENT DOCUMENTS

| | | | |
|---|---|---|---|
| CN | 112382235 | A | 2/2021 |
| CN | 112562593 | A | 3/2021 |
| CN | 113314073 | A | 8/2021 |
| CN | 113421514 | A | 9/2021 |
| CN | 113889042 | A | 1/2022 |
| CN | 114005396 | A | 2/2022 |

* cited by examiner

PIXEL CIRCUIT AND DRIVING METHOD THEREOF, AND DISPLAY PANEL

CROSS-REFERENCE TO RELATED APPLICATION

This application is a national phase entry under 35 USC 371 of International Patent Application No. PCT/CN 2022/096242 filed on May 31, 2022, which is incorporated herein by reference in its entirety.

TECHNICAL FIELD

The present disclosure relates to the field of display technologies, and in particular, to a pixel circuit and a driving method thereof, and a display panel.

BACKGROUND

A display device includes a plurality of pixel driving circuits and a plurality of light-emitting elements, and the pixel driving circuits are used for driving respective light-emitting elements to emit light, thereby realizing a display function of the display device.

However, in a light-emitting phase of an existing pixel driving circuit, the display device is prone to screen flicker during display due to an unstable gate voltage of a driving transistor in the pixel driving circuit.

SUMMARY

In an aspect, some embodiments of the present disclosure provide a pixel circuit. The pixel circuit includes a driving sub-circuit, a compensation sub-circuit, an adjustment sub-circuit and a writing sub-circuit. The driving sub-circuit is coupled to a first node, a second node and a third node. The driving sub-circuit is configured to, in a writing phase, transmit a voltage from the second node to the third node under a control of a voltage of the first node. The writing sub-circuit is coupled to the second node, a second scan signal terminal and a data signal terminal. The writing sub-circuit is configured to: in the writing phase, transmit a data signal received at the data signal terminal to the second node under a control of a gate scan signal received from the second scan signal terminal; and in an adjustment phase, transmit the data signal received at the data signal terminal to the second node under the control of the gate scan signal received from the second scan signal terminal, so as to reset the second node. The compensation sub-circuit is coupled to the first node, the third node and a first scan signal terminal. The compensation sub-circuit is configured to: in an initialization phase, transmit the voltage of the first node to the third node under a control of a scan signal transmitted from the first scan signal terminal; and in the writing phase, transmit a voltage of the third node to the first node under the control of the scan signal transmitted from the first scan signal terminal. The compensation sub-circuit includes a first transistor group, and the first transistor group includes at least two first transistors connected in series. Gates of all the first transistors in the first transistor group are coupled to the first scan signal terminal, a first electrode of a first first transistor in the first transistor group is coupled to the first node, and a second electrode of a last first transistor in the first transistor group is coupled to the third node. A fourth node is formed between a second electrode of the first first transistor in the first transistor group and a first electrode of a second first transistor in the first transistor group. The adjustment sub-circuit is coupled to the fourth node and at least one control terminal. The adjustment sub-circuit is configured to, in light-emitting phases, adjust a voltage of the fourth node under a control of a signal from the at least one control terminal, so as to reduce a voltage difference between the fourth node and the first node.

In some embodiments, the at least one control terminal includes a first control signal terminal. The adjustment sub-circuit includes a first capacitor. A first electrode of the first capacitor is coupled to the fourth node, and a second electrode of the first capacitor is coupled to the first control signal terminal.

In some embodiments, the at least one control terminal includes a second control signal terminal and a reference voltage terminal. The adjustment sub-circuit includes a second transistor. A gate of the second transistor is coupled to the second control signal terminal, a second electrode of the second transistor is coupled to the fourth node, and a first electrode of the second transistor is coupled to the reference voltage terminal.

In some embodiments, the driving sub-circuit includes a driving transistor. A gate of the driving transistor is coupled to the first node, a first electrode of the driving transistor is coupled to the second node, and a second electrode of the driving transistor is coupled to the third node.

In some embodiments, the writing sub-circuit includes a third transistor. A gate of the third transistor is coupled to the second scan signal terminal, a first electrode of the third transistor is coupled to the data signal terminal, and a second electrode of the third transistor is coupled to the second node.

In some embodiments, the pixel circuit further includes an energy storage sub-circuit. The energy storage sub-circuit includes a second capacitor. A first electrode of the second capacitor is coupled to a first voltage terminal, and a second electrode of the second capacitor is coupled to the first node. The energy storage sub-circuit is configured to store and maintain the voltage of the first node.

In some embodiments, the pixel circuit further includes a first reset sub-circuit and a second reset sub-circuit. The first reset sub-circuit is coupled to a first reset signal terminal, a first initialization signal terminal and the first node. The first reset sub-circuit is configured to transmit an initialization signal received at the first initialization signal terminal to the first node under a control of a first reset signal received from the first reset signal terminal. The second reset sub-circuit is coupled to a second reset signal terminal, and a second initialization signal terminal, and is configured to be coupled to a light-emitting device. The second reset sub-circuit is configured to transmit an initialization signal received at the second initialization signal terminal to the light-emitting device under a control of a second reset signal received from the second reset signal terminal.

In some embodiments, the first reset sub-circuit includes a sixth transistor, and a gate of the sixth transistor is coupled to the first reset signal terminal, a first electrode of the sixth transistor is coupled to the first initialization signal terminal, and a second electrode of the sixth transistor is coupled to the first node; or the first reset sub-circuit includes a sixth transistor group, and the sixth transistor group includes at least two sixth transistors connected in series; gates of all the sixth transistors in the sixth transistor group are coupled to the first reset signal terminal, a first electrode of a first sixth transistor in the sixth transistor group is coupled to the first initialization signal terminal, and a second electrode of a last sixth transistor in the sixth transistor group is coupled to the first node.

In some embodiments, the second reset sub-circuit includes a seventh transistor. A gate of the seventh transistor is coupled to the second reset signal terminal, a first electrode of the seventh transistor is coupled to the second initialization signal terminal, and a second electrode of the seventh transistor is coupled to the light-emitting device.

In some embodiments, the second scan signal terminal and the second reset signal terminal respond to a control of a same control signal.

In some embodiments, the pixel circuit further includes a light-emitting control sub-circuit. The light-emitting control sub-circuit is coupled to a first voltage terminal, an enable signal terminal, the second node, and the third node, and is configured to be coupled to a light-emitting device. The light-emitting control sub-circuit is configured to transmit, under a control of a signal from the enable signal terminal, a driving signal to the light-emitting device in cooperation with the driving sub-circuit.

In some embodiments, the light-emitting control sub-circuit includes a fourth transistor and a fifth transistor. A gate of the fourth transistor is coupled to the enable signal terminal, a first electrode of the fourth transistor is coupled to the first voltage terminal, and a second electrode of the fourth transistor is coupled to the second node. A gate of the fifth transistor is coupled to the enable signal terminal, a first electrode of the fifth transistor is coupled to the third node, and a second electrode of the fifth transistor is coupled to the light-emitting device.

In some embodiments, the at least one control terminal includes a first control signal terminal, and the enable signal terminal and the first control signal terminal respond to a control of a same control signal; or the at least one control terminal includes a second control signal terminal and a reference voltage terminal, and the enable signal terminal and the second control signal terminal respond to a control of a same control signal.

In another aspect, embodiments of the present disclosure provide a driving method, and the driving method is applied to the above pixel circuit. The pixel circuit includes a driving sub-circuit, a compensation sub-circuit, an adjustment sub-circuit, a writing sub-circuit and a light-emitting control sub-circuit. The driving sub-circuit is coupled to a first node, a second node and a third node. The compensation sub-circuit is coupled to the first node, the third node, a fourth node and a first scan signal terminal. The adjustment sub-circuit is coupled to the fourth node and at least one control terminal. The writing sub-circuit is coupled to the second node, a second scan signal terminal and a data signal terminal. The light-emitting control sub-circuit is coupled to a first voltage terminal, an enable signal terminal, the second node, and the third node, and is configured to be coupled to a light-emitting device. The driving method includes a writing phase, a first light-emitting phase, an adjustment phase and a second light-emitting phase. In the writing phase, the writing sub-circuit transmits a data signal received at the data signal terminal to the second node under a control of a gate scan signal received from the second scan signal terminal; the driving sub-circuit transmits the data signal from the second node to the third node; and the compensation sub-circuit transmits the data signal from the third node to the first node. In the first light-emitting phase, the adjustment sub-circuit adjusts a voltage of the fourth node under a control of a signal from the at least one control terminal to reduce a voltage difference between the fourth node and the first node; and the light-emitting control sub-circuit transmits a voltage signal supplied from the first voltage terminal to the light-emitting device under a control of a signal from the enable signal terminal in cooperation with the driving sub-circuit, so as to drive the light-emitting device to emit light. In the adjustment phase, the writing sub-circuit transmits the data signal received at the data signal terminal to the second node under the control of the gate scan signal received from the second scan signal terminal, so as to reset the second node. In the second light-emitting phase, the adjustment sub-circuit adjusts the voltage of the fourth node under the control of the signal from the at least one control terminal to reduce the voltage difference between the fourth node and the first node; and the light-emitting control sub-circuit transmits the voltage signal supplied from the first voltage terminal to the light-emitting device under the control of the signal from the enable signal terminal in cooperation with the driving sub-circuit, so as to drive the light-emitting device to emit light.

In some embodiments, the pixel circuit further includes a first reset sub-circuit. The first reset sub-circuit is coupled to a first reset signal terminal, a first initialization signal terminal and the first node. The driving method further includes an initialization phase, and the initialization phase includes at least two reset sub-phases. In the reset sub-phases, the reset sub-circuit transmits an initialization signal received at the first initialization signal terminal to the first node under a control of a first reset signal received from the first reset signal terminal; and the compensation sub-circuit transmits a voltage of the first node to the third node under a control of a scan signal transmitted from the first scan signal terminal.

In yet another aspect, embodiments of the present disclosure provide a display panel. The display panel includes pixel circuits each according to any one of the above embodiments and light-emitting devices electrically connected to the pixel circuits.

In some embodiments, the display panel includes a substrate and a first gate conductive layer located on a side of the substrate. The first gate conductive layer includes a second scan signal line extending in a first direction. In a case where the writing sub-circuit includes the third transistor, and the pixel circuit further includes the seventh transistor, the second scan signal line includes at least a first portion and a second portion. The first portion is further used as the gate of the third transistor, and the second portion is further used as the gate of the seventh transistor.

In some embodiments, the display panel includes a substrate and a first gate conductive layer located on a side of the substrate. The first gate conductive layer includes an enable signal line extending in a first direction. In a case where the adjustment sub-circuit includes the second transistor, the enable signal line includes at least a third portion, and the third portion is further used as the gate of the second transistor.

In some embodiments, in a case where the pixel circuit includes the fourth transistor and the fifth transistor, the enable signal line further includes a fourth portion and a fifth portion. The fourth portion is further used as the gate of the fourth transistor, and the fifth portion is further used as the gate of the fifth transistor. The gate of the second transistor is located on a side of the gate of the fifth transistor away from the gate of the fourth transistor.

In some embodiments, the display panel further includes a second gate conductive layer located on a side of the first gate conductive layer away from the substrate and a first source-drain conductive layer located on a side of the second gate conductive layer away from the substrate. The first source-drain conductive layer includes reference voltage lines extending in a second direction. The second direction and the first direction intersect. An orthographic projection of a reference voltage line on the substrate is at least partially overlapped with an orthographic projection of the gate of the second transistor on the substrate. An overlapping area of the orthographic projection of the reference voltage line on the substrate and an orthographic projection of the fourth node on the substrate is less than 50% of an area of the orthographic projection of the fourth node on the substrate.

In some embodiments, the reference voltage line includes a first body portion and a second body portion each extending in the second direction. The reference voltage line further includes a first connection portion connected between the first body portion and the second body portion and extending in the first direction. An orthographic projection of an end of the first connection portion on the substrate is overlapped with the orthographic projection of the gate of the second transistor on the substrate, and an orthographic projection of another end of the first connection portion on the substrate is overlapped with an orthographic projection of the gate of the fifth transistor on the substrate.

In some embodiments, the orthographic projection of the reference voltage line on the substrate is at least partially overlapped with an orthographic projection of the gate of the fifth transistor on the substrate; and/or the orthographic projection of the reference voltage line on the substrate is at least partially overlapped with orthographic projections of the gates in the first transistor group on the substrate.

In some embodiments, the first source-drain conductive layer further includes a first connection line. The first electrode of the second transistor is coupled to the reference voltage line. The second electrode of the second transistor is coupled to the fourth node through the first connection line. The reference voltage line is bent in the first direction, so that the orthographic projection of the reference voltage line on the substrate is non-overlapped with an orthographic projection of the first connection line on the substrate.

In some embodiments, in a case where the pixel circuit includes the driving transistor and a second capacitor, the first gate conductive layer further includes second electrode plates. An upper electrode plate of the second capacitor is coupled to a first voltage terminal, and a lower electrode plate of the second capacitor is coupled to the first node. A second electrode plate is the lower electrode plate of the second capacitor, and is further used as the gate of the driving transistor. The first source-drain conductive layer further includes first voltage signal lines extending in the second direction. An orthographic projection of a first voltage signal line on the substrate is at least partially overlapped with an orthographic projection of the gate of the driving transistor on the substrate, and is at least partially overlapped with an orthographic projection of the gate of the fourth transistor on the substrate.

In some embodiments, the display panel further includes a second source-drain conductive layer located on a side of the first source-drain conductive layer away from the substrate. The second source-drain conductive layer includes data signal lines extending in the second direction. A reference voltage line and a data signal line that are connected to a same column of pixel circuits are respectively located on two sides of a first voltage signal line that is connected to the same column of pixel circuits. The second source-drain conductive layer further includes shielding members, and a shielding member is connected to the first voltage signal line. An orthographic projection of the shielding member on the substrate is overlapped with an orthographic projection of the first node on the substrate.

In some embodiments, the second gate conductive layer includes first electrode plates and shielding portions. A first electrode plate is the upper electrode plate of the second capacitor. An orthographic projection of the first electrode plate on the substrate is partially overlapped with an orthographic projection of the second electrode plate on the substrate. An orthographic projection of a shielding portion on the substrate is partially overlapped with an orthographic projection of the second node on the substrate. The shielding portion is electrically connected to the first voltage signal line, and the shielding portion and the first electrode plate are of an integral structure.

In some embodiments, in a case where the pixel circuit includes the sixth transistor group and the seventh transistor, the second gate conductive layer includes a first initialization signal line and a second initialization signal line each extending in the first direction. The sixth transistor group is electrically connected to the first initialization signal line, and the seventh transistor is electrically connected to the second initialization signal line.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method, and an actual timing of a signal involved in the embodiments of the present disclosure.

DETAILED DESCRIPTION

Figure 1:
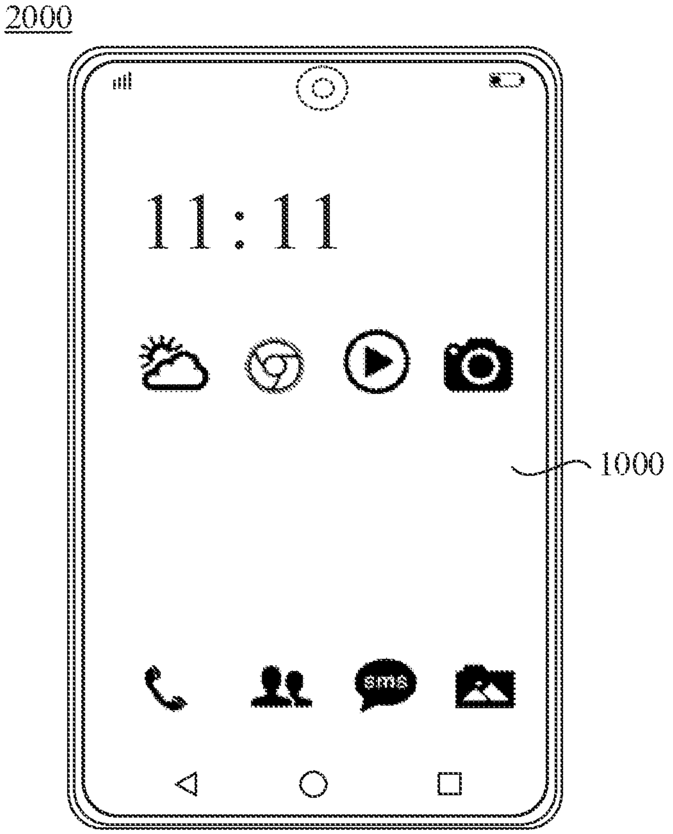
FIG. 1 is a structural diagram of a display device, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments." "an example," "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of the phrase "configured to" herein means an open and inclusive expression, which does not exclude devices that are applicable to or configured to perform additional tasks or steps.

In addition, the use of the phase "based on" means openness and inclusiveness, since a process, step, calculation or other action that is "based on" one or more stated conditions or values may, in practice, be based on additional conditions or values exceeding those stated.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing techniques and/or tolerances may be envisaged. Therefore, the exemplary embodiments should not be construed to be limited to the shapes of regions shown herein, but to include deviations in shape due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Transistors used in circuit structures (e.g., pixel circuits) provided in the embodiments of the present disclosure may be thin film transistors (TFTs), field effect transistors (e.g., metal-oxide semiconductor field effect transistors, MOSFETs) or other switching devices with same properties. In the embodiments of the present disclosure, the thin film transistors are taken as an example for description.

In the circuit structures provided in the embodiments of the present disclosure, a first electrode of each transistor is one of a source and a drain thereof, and a second electrode of each transistor is another one of the source and the drain thereof. Since a source and a drain of a transistor may be symmetrical in structure, the source and the drain thereof may be the same in structure. That is, the first electrode and the second electrode of the transistor in the embodiments of the present disclosure may be the same in structure. For example, in a case where the transistor is a P-type transistor, the first electrode of the transistor is a source, and the second electrode of the transistor is a drain. For example, in a case where the transistor is an N-type transistor, the first electrode of the transistor is a drain, and the second electrode of the transistor is a source.

In the circuit structures provided in the embodiments of the present disclosure, nodes such as a first node and a second node do not represent actual components, but represent junctions of related couplings in circuit diagrams. That is, these nodes are nodes that are equivalent to the junctions of the related couplings in the circuit diagrams.

In the transistors included in the circuit structures in the embodiments of the present disclosure, all of the transistors may be N-type transistors or P-type transistors, or a part of the transistors are N-type transistors, and another part of the transistors are P-type transistors. In the present disclosure, an "active level" refers to a level at which a transistor is able to be turned on. The P-type transistor may be turned on under a control of a low level signal, and the N-type transistor may be turned on under a control of a high level signal.

Hereinafter, a schematic description will be made in an example where the transistors included in the circuit structures in the embodiments of the present disclosure are all P-type transistors.

In the present disclosure, the P-type transistor may be turned on under the control of the low level signal, and the N-type transistor may be turned on under the control of the high level signal.

As shown in FIG. 1, some embodiments of the present disclosure provide a display device 2000. The display device 2000 includes a display panel 1000.

In some examples, the display device 2000 may be an organic light-emitting diode (OLED) display device.

For example, the display device 2000 further includes a frame, a display driving integrated circuit (IC) and other electronic accessories.

The display device 2000 may be any device that displays images whether moving (e.g., videos) or stationary (e.g., still images) or text. More specifically, it is anticipated that the display device in the embodiments may be implemented in, or associated with, a variety of electronic devices. The variety of electronic devices are, for example (but not limit to), mobile phones, wireless devices, personal data assistants (PDAs), hand-held or portable computers, global positioning system (GPS) receivers/navigators, cameras, MP4 video players, camcorders, game consoles, watches, clocks, calculators, television monitors, flat panel displays, computer monitors, auto displays (e.g., odometer displays), navigators, cockpit controllers and/or displays, camera view displays (e.g., rear-view camera displays in vehicles), electronic photos, electronic billboards or signs, projectors, architectural structures, packaging and aesthetic structures (e.g., displays for displaying an image of a piece of jewelry).

Figure 2:
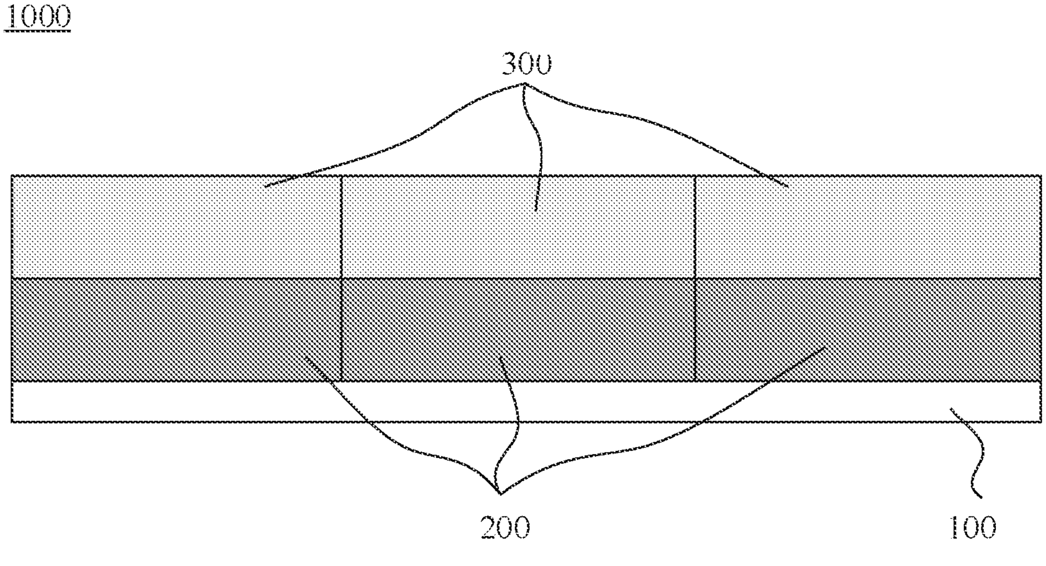
FIG. 2 is a structural diagram of a display panel, in accordance with some embodiments of the present disclosure.

In some embodiments, proceeding to FIG. 2, the display panel 1000 includes a substrate 100, a plurality of pixel circuits 200 disposed on a side of the substrate 100, and a plurality of light-emitting devices 300 disposed on a side of the plurality of pixel circuits 200 away from the substrate 100.

For example, the substrate 100 may be a flexible substrate or a rigid substrate.

For example, in a case where the substrate 100 is the flexible substrate, the substrate 100 may be made of a material with high elasticity such as dimethyl siloxane, polyimide (PI), or polyethylene terephthalate (PET).

For another example, in a case where the substrate 100 is the rigid substrate, the substrate 100 may be made of glass.

In some examples, the plurality of pixel circuits 200 may be coupled to the plurality of light-emitting devices 300 in one-to-one correspondence. In some other examples, a pixel circuit 200 may be coupled to light-emitting devices 300, or pixel circuits 200 may be coupled to a light-emitting device 300.

Hereinafter, a structure of the display panel 1000 will be schematically described in the present disclosure in an example where a pixel circuit 200 is coupled to a light-emitting device 300.

For example, in the display panel 1000, the pixel circuit 200 may generate a driving signal. Each light-emitting device 300 may emit light due to a driving action of a driving signal generated by a respective pixel circuit 200. Light emitted from the plurality of light-emitting devices 300 cooperates with each other, so as to realize a display function of the display panel 1000.

For example, the light-emitting device 300 may be an OLED light-emitting device.

Figure 3:
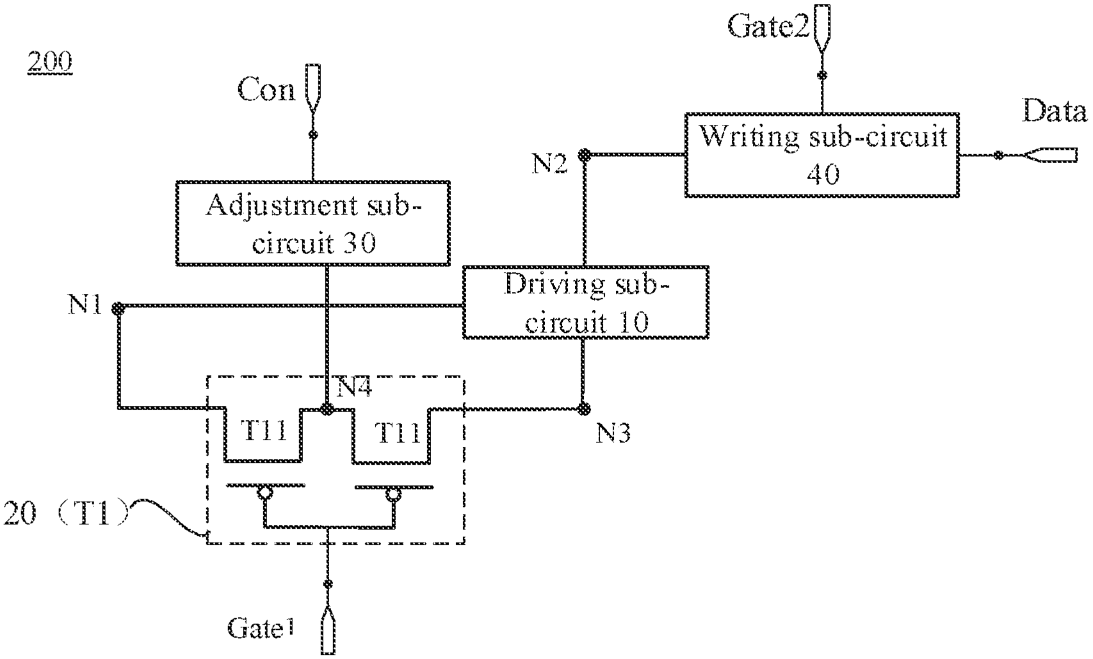
FIG. 3 is a structural diagram of a pixel circuit, in accordance with some embodiments of the present disclosure.

In some embodiments, referring to FIG. 3, the pixel circuit 200 includes a driving sub-circuit 10 and a compensation sub-circuit 20.

In some examples, referring to FIG. 3 again, the driving sub-circuit 10 is coupled to a first node N1, a second node N2 and a third node N3. The driving sub-circuit 10 is configured to, in a writing phase, transmit an electrical signal from the second node N2 to the third node N3 under a control of a voltage of the first node N1.

In some examples, referring to FIG. 3 again, the compensation sub-circuit 20 is coupled to the first node N1, the third node N3 and a first scan signal terminal Gate1. The compensation sub-circuit 20 is configured to: in an initialization phase, transmit the voltage of the first node N1 to the third node N3 under a control of a scan signal transmitted from the first scan signal terminal Gate1; and in the writing phase, transmit a voltage of the third node N3 to the first node N1 under the control of the scan signal transmitted from the first scan signal terminal Gate1.

In some examples, in an initialization phase of an image frame, the compensation sub-circuit 20 is turned on twice or more. Thus, the transmission of the voltage of the first node N1 to the third node N3 may be performed repeatedly, so that the third node N3 may be reset more completely.

In some examples, referring to FIG. 3 again, the compensation sub-circuit 20 includes a first transistor group T1, and the first transistor group T1 includes at least two first transistors T11 connected in series. Gates of all the first transistors T11 in the first transistor group T1 are coupled to the first scan signal terminal Gate1, a first electrode of a first first transistor T11 in the first transistor group T1 is coupled to the first node N1, and a second electrode of a last first transistor T11 in the first transistor group T1 is coupled to the third node N3. A fourth node N4 is formed between a second electrode of the first first transistor T11 in the first transistor group T1 and a first electrode of a second first transistor T11 in the first transistor group T1.

It will be noted that the first transistor group T1 may include two or more first transistors T11 connected in series. In a case the first transistor group T1 includes two first transistors T11 connected in series, the fourth node N4 is formed between the two first transistors T11, as shown in FIG. 3. In a case where the first transistor group T1 includes more than two first transistors T11 connected in series, in the more than two first transistors T11, the fourth node N4 is formed between the second electrode of the first first transistor T11 and the first electrode of the second first transistor T11. The first first transistor T11 and the second first transistor T11 are away from the first node N1 in sequence.

In these examples, in a case where the first transistor group T1 includes the at least two first transistors T11 connected in series, a risk of an electric leakage of the first node N1 from the first transistor group T1 may be reduced, which is more conducive to ensuring a stability of the voltage of the first node N1.

In some examples, referring to FIG. 3 again, the pixel circuit 200 further includes a writing sub-circuit 40. The writing sub-circuit 40 is coupled to the second node N2, a second scan signal terminal Gate2 and a data signal terminal Data. The writing sub-circuit 40 is configured to: in the writing phase, transmit a data signal received at the data signal terminal Data to the second node N2 under a control of a gate scan signal received from the second scan signal terminal Gate2; and in an adjustment phase, transmit the data signal received at the data signal terminal Data to the second node N2 under the control of the gate scan signal received from the second scan signal terminal Gate2 to reset the second node N2.

By using the above arrangement, in the writing phase, the writing sub-circuit 40 may be turned on under the control of the gate scan signal received from the second scan signal terminal Gate2, so that the writing sub-circuit 40 transmits the data signal received at the data signal terminal Data to the second node N2, and the data signal is changed into a compensation signal through the driving sub-circuit 10. The compensation signal is transmitted to the first node N1 through the compensation sub-circuit 20. That is, the compensation signal is written, and a compensation of a threshold voltage Vth is also realized. Moreover, in the adjustment phase, the data signal received at the data signal terminal Data is transmitted to the second node N2 under the control of the gate scan signal received from the second scan signal terminal Gate2 to reset the second node N2, which may effectively counteract a hysteresis effect of a driving transistor TD to improve a luminance retention in a frame, thereby reducing a screen flicker phenomenon of the display panel 1000 at a low frequency.

It will be noted that each sub-pixel in the display panel 1000 is driven by a plurality of thin film transistors (TFTs) to emit light, and the TFT driving technology may improve a display speed, a contrast, a luminance and a resolution. However, the TFT has the hysteresis effect, and the hysteresis effect of the TFT is an uncertainty in electrical characteristics of the TFT under a certain bias voltage. That is, a current flowing through the TFT is not only related to a current bias voltage, but also to a state of the TFT at a previous moment. The hysteresis effect of the TFT is related to a gate dielectric and a semiconductor material of the TFT, and an interface state trap between the gate dielectric and the semiconductor material. In a light-emitting phase, the hysteresis effect of the TFTs results in a trend of a current reduction in a frame, which is perceived by human eyes as the flicker phenomenon, thereby affecting the display quality of the display panel 1000.

It is found through research that, in the writing phase, the voltage of the first node N1 and a voltage of the fourth node N4 are substantially equal. In a light-emitting phase, the voltage of the fourth node N4 is pulled high, so that the voltage of the fourth node N4 is greater than the voltage of the first node N1. Thus, the voltage of the first node N1 cannot be stabilized, which results in a low luminance retention of the light-emitting device in a frame. When the luminance retention in the frame is reduced to an extent that can be observed by human eyes, the screen flicker phenomenon is likely to occur.

Figure 4A:
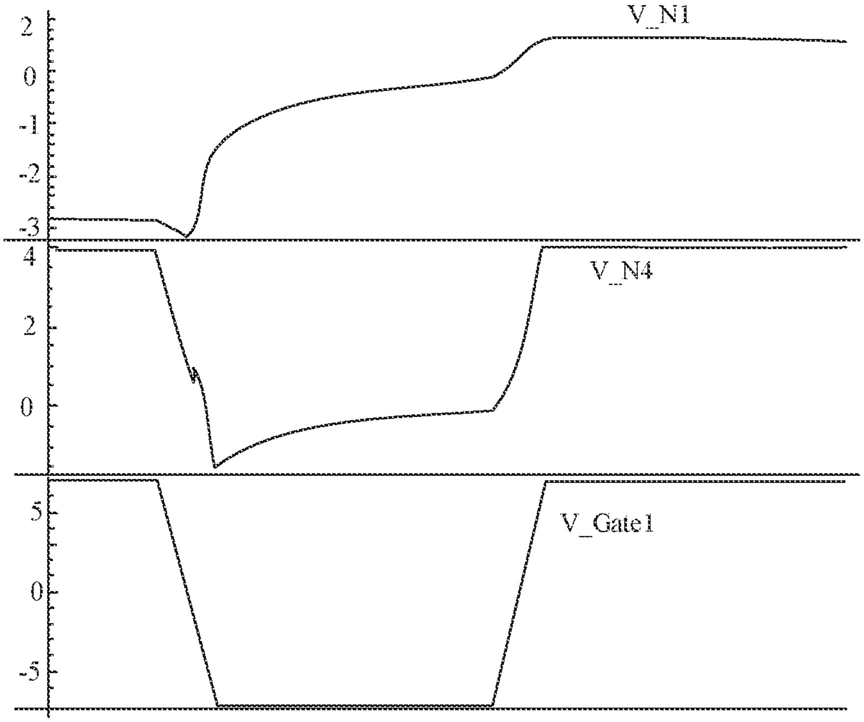
FIG. 4A is a simulation diagram showing a voltage variation of a first node, a voltage variation of a fourth node and a voltage variation of a scan signal supplied from a first scan signal terminal in a pixel circuit, in accordance with some embodiments of the present disclosure.

In a case where the pixel circuit 200 includes the driving sub-circuit 10, the compensation sub-circuit 20 and the writing sub-circuit 40, the voltage V_N1 of the first node N1, the voltage V_N4 of the fourth node N4 and a voltage V_Gate1 of the scan signal supplied from the first scan signal terminal Gate1 were simulated and verified in the present disclosure, and the obtained calculation results are as shown in FIG. 4A.

When the scan signal supplied from the first scan signal terminal Gate1 is a low voltage signal, the at least two first transistors T11 connected in series that are included in the first transistor group T1 are turned on under a control of the low voltage signal supplied from the first scan signal terminal Gate1, so that the voltage of the fourth node N4 is equal to the voltage of the first node N1.

When the scan signal supplied from the first scan signal terminal Gate1 is changed into a high voltage signal, the at least two first transistors T11 connected in series that are included in the first transistor group T1 are turned off under a control of the high voltage signal supplied from the first scan signal terminal Gate1. In this case, since in the first transistor group, a gate and a source of the first transistor T1 have a capacitor Cgs therebetween or the gate and a drain of the first transistor T1 have a capacitor Cgd therebetween, when the voltage of the scan signal supplied from the first scan signal terminal Gate1 is changed from a low voltage to a high voltage, the voltage of the fourth node N4 is pulled high due to a coupling effect of the capacitor Cgs or the capacitor Cgd.

Figure 4B:
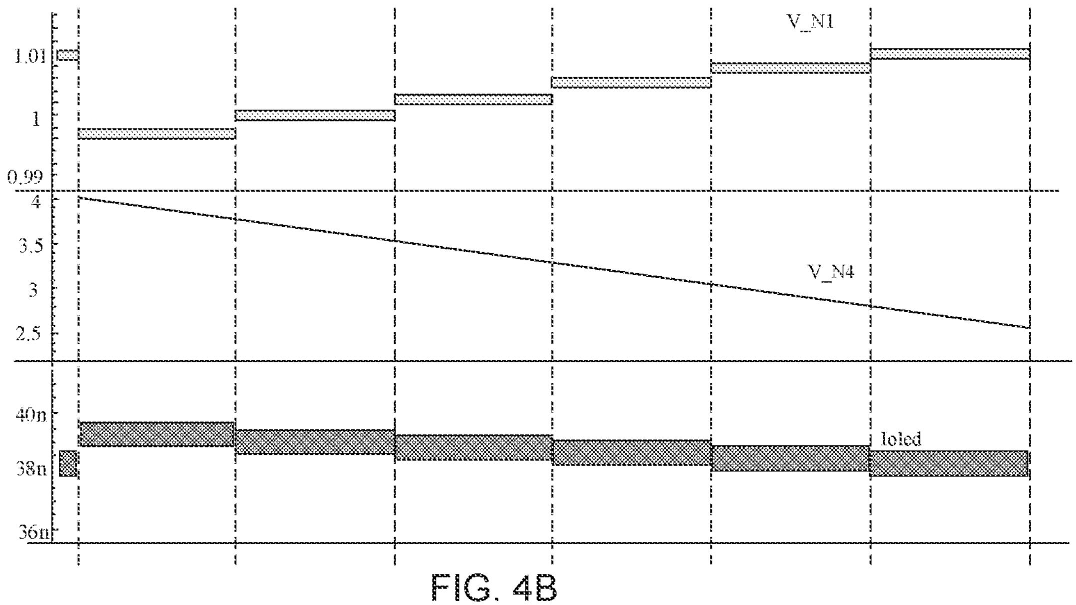
FIG. 4B is a simulation diagram showing a voltage variation of a first node, a voltage variation of a fourth node and a current variation of a light-emitting device in a pixel circuit, in accordance with some embodiments of the present disclosure.

The voltage V_N1 of the first node N1, the voltage V_N4 of the fourth node N4 and a current $I_{oled}$ of the light-emitting device in a frame were simulated and verified in the present disclosure, and the obtained calculation results are as shown in FIG. 4B.

When the voltage of the fourth node N4 is pulled high, the voltage of the first node N1 cannot be stabilized, which results in the low luminance retention of the light-emitting device in the frame.

Based on this, the pixel circuit 200 in the present disclosure further includes an adjustment sub-circuit 30.

In some examples, referring to FIG. 3 again, the adjustment sub-circuit 30 is coupled to the fourth node N4 and at least one control terminal Con. The adjustment sub-circuit 30 is configured to, in light-emitting phases, adjust the voltage of the fourth node N4 under a control of signal(s) from the at least one control terminal Con to reduce a voltage difference between the fourth node N4 and the first node N1.

In the pixel circuit 200 provided in some embodiments of the present disclosure, on one hand, the adjustment sub-circuit 30 is arranged to be coupled to the fourth node N4 and the at least one control terminal Con, and in the light-emitting phases (which may include a first light-emitting phase and a second light-emitting phase), the adjustment sub-circuit 30 adjusts the voltage of the fourth node N4 under the control of the signal(s) from the at least one control terminal Con to reduce the voltage difference between the fourth node N4 and the first node N1, so that a potential of the fourth node N4 is equal to or substantially equal to a potential of the first node N1. Thus, a potential stability of the first node N1 may be improved, so that the luminance retention of the light-emitting device 300 in the frame is high, thereby reducing the screen flicker phenomenon of the display panel 1000. On another hand, in the adjustment phase, the writing sub-circuit 40 transmits the data signal received at the data signal terminal Data to the second node N2 under the control of the gate scan signal received from the second scan signal terminal Gate2 to reset the second node N2, which may effectively counteract the hysteresis effect of the driving transistor TD to improve the luminance retention in the frame, thereby reducing the screen flicker phenomenon of the display panel 1000 at the low frequency.

Figure 6:
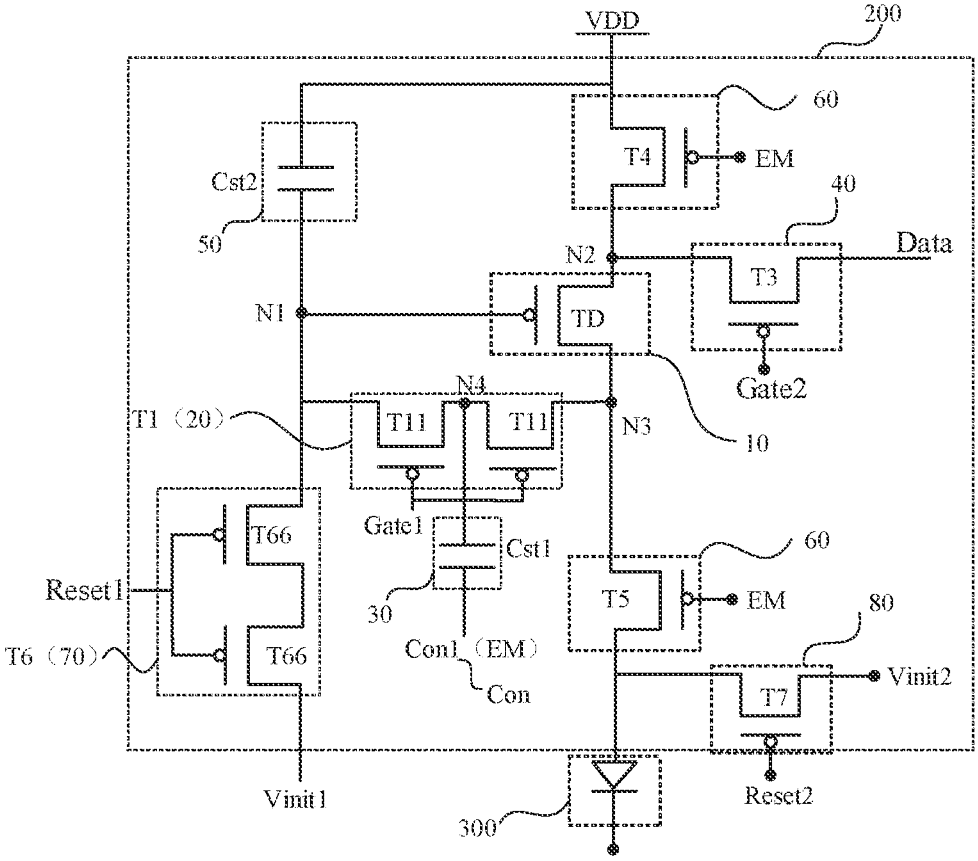
FIG. 6 is a structural diagram of yet another pixel circuit, in accordance with some embodiments of the present disclosure.

In some embodiments, referring to FIG. 6, the at least one control terminal Con includes a first control signal terminal Con1. In this case, the adjustment sub-circuit 30 includes a first capacitor Cst1.

In some examples, referring to FIG. 6 again, a first electrode of the first capacitor Cst1 is coupled to the fourth node N4, and a second electrode of the first capacitor Cst1 is coupled to the first control signal terminal Con1.

For example, in the writing phase, the scan signal transmitted from the first scan signal terminal Gate1 is a low level signal, so that the first transistor group T1 included in the compensation sub-circuit 20 is turned on under a control of the low level signal transmitted from the first scan signal terminal Gate1, and in this case, the voltage of the first node N1 and the voltage of the fourth node N4 are equal. In the light-emitting phases, the scan signal transmitted from the first scan signal terminal Gate1 is a high level signal, so that the first transistor group T1 included in the compensation sub-circuit 20 is turned off under a control of the high level signal transmitted from the first scan signal terminal Gate1.

The voltage of the fourth node N4 is pulled high due to the coupling effect of the capacitor Cgs or the capacitor Cgd, and in this case, the first capacitor Cst1 pulls down the voltage of the fourth node N4 under a control of a signal from the first control signal terminal Con1, so that the voltage difference between the fourth node N4 and the first node N1 is reduced, which is conducive to ensuring a high stability of the potential of the first node N1 and avoiding affecting the operation of the pixel circuit 200, thereby reducing the screen flicker phenomenon of the display panel 1000.

Figure 7A:
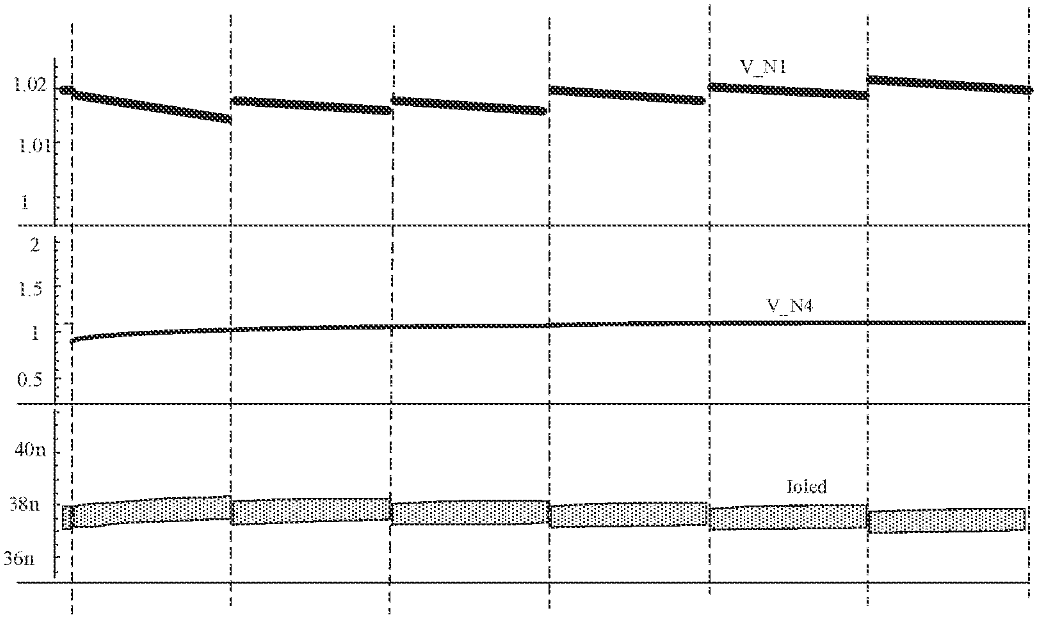
FIG. 7A is a simulation diagram showing a voltage variation of a first node, a voltage variation of a fourth node and a current variation of a light-emitting device in a pixel circuit, in accordance with some embodiments of the present disclosure.
Figure 7B:
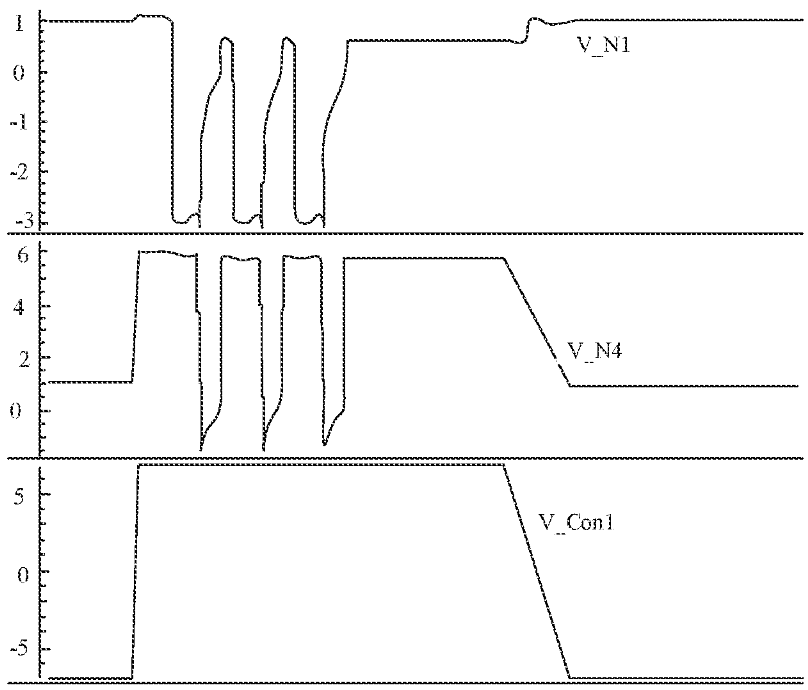
FIG. 7B is a simulation diagram showing a voltage variation of a first node, a voltage variation of a fourth node and a voltage variation of a first control signal terminal in a pixel circuit, in accordance with some embodiments of the present disclosure.

In a case where the pixel circuit 200 includes the adjustment sub-circuit 30, and the adjustment sub-circuit 30 includes the first capacitor Cst1, the voltage V_N1 of the first node N1, the voltage V_N4 of the fourth node N4, a voltage V_Con1 of the signal from the first control signal terminal Con1 and the current $I_{oled}$ of the light-emitting device were simulated and verified in the present disclosure, and the obtained calculation results are as shown in FIGS. 7A and 7B.

In the writing phase, the signal from the first control signal terminal Con1 is a high voltage signal. In the light-emitting phases, the voltage of the fourth node N4 is pulled high, and in this case, the signal from the first control signal terminal Con1 is changed from the high voltage signal into a low voltage signal, and the voltage of the fourth node N4 is pulled down due to a coupling effect of the first capacitor Cst1 to reduce the voltage difference between the fourth node N4 and the first node N1, so that the voltage difference between the fourth node N4 and the first node N1 is small or even zero, which is conducive to ensuring the high stability of the potential of the first node N1. Thus, an accuracy of an on state of the driving transistor TD may be ensured, so as to ensure an accuracy of an electrical signal transmitted to the light-emitting device 300, thereby effectively reducing the screen flicker phenomenon of the display panel 1000.

It will be noted that the schematic description is made in the above embodiments in the example where the transistors included in the circuit structures are all P-type transistors.

In some other embodiments, in a case where the transistors included in the circuit structures are all N-type transistors, the N-type transistor may be turned on under the control of the high level signal.

For example, in the writing phase, the scan signal transmitted from the first scan signal terminal Gate1 is a high level signal, so that the first transistor group T1 included in the compensation sub-circuit 20 is turned on under a control of the high level signal transmitted from the first scan signal terminal Gate1, and in this case, the voltage of the first node N1 and the voltage of the fourth node N4 are equal. In the light-emitting phases, the scan signal transmitted from the first scan signal terminal Gate1 is a low level signal, so that the first transistor group T1 included in the compensation sub-circuit 20 is turned off under a control of the low level signal transmitted from the first scan signal terminal Gate1. The voltage of the fourth node N4 is pulled down due to the coupling effect of the capacitor Cgs or the capacitor Cgd. In this case, the adjustment sub-circuit 30 pulls the voltage of the fourth node N4 up under the control of the signal(s) from the at least one control terminal Con to reduce the voltage difference between the first node N1 and the fourth node N4, so that the voltage of the fourth node N4 is equal to or substantially equal to the voltage of the first node N1. Thus, the potential stability of the first node N1 may be improved, so that the luminance retention of the light-emitting device 300 in the frame is high, thereby reducing the screen flicker phenomenon of the display panel 1000.

Figure 8:
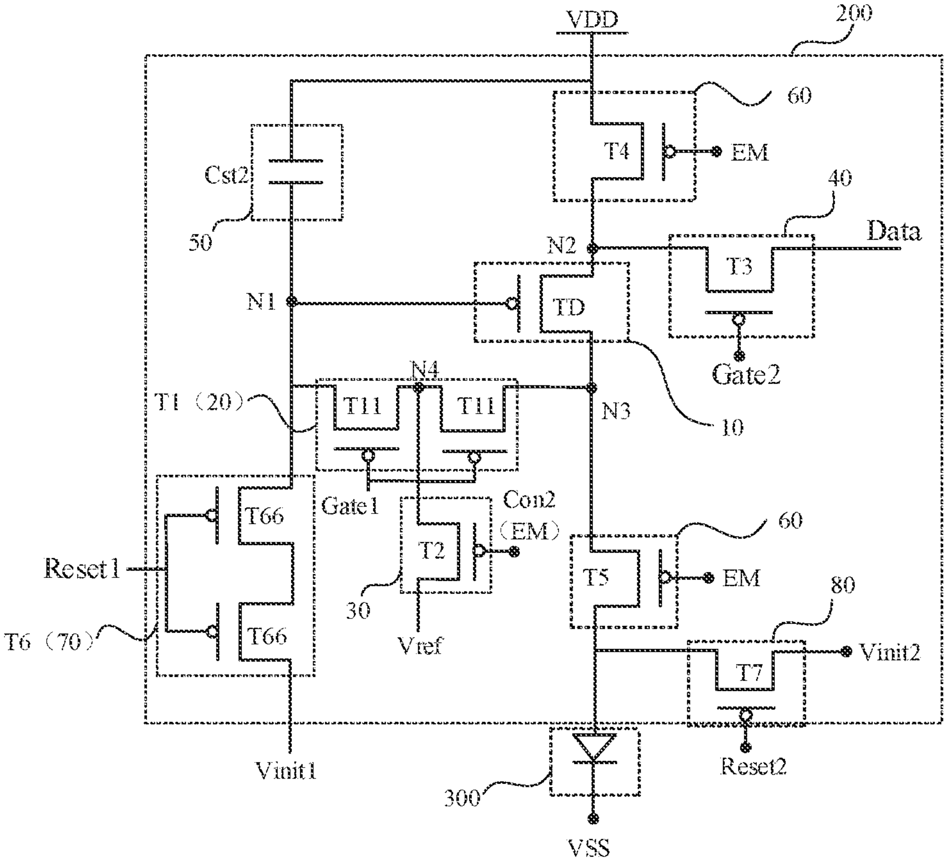
FIG. 8 is a structural diagram of yet another pixel circuit, in accordance with some embodiments of the present disclosure.

In some embodiments, referring to FIG. 8, the at least one control terminal Con includes a second control signal terminal Con2 and a reference voltage terminal Vref. In this case, the adjustment sub-circuit 30 includes a second transistor T2.

In some examples, referring to FIG. 8 again, a gate of the second transistor T2 is coupled to the second control signal terminal Con2, a second electrode of the second transistor T2 is coupled to the fourth node N4, and a first electrode of the second transistor T2 is coupled to the reference voltage terminal Vref.

For example, in the writing phase, the scan signal transmitted from the first scan signal terminal Gate1 is a low level signal, so that the first transistor group T1 included in the compensation sub-circuit 20 is turned on under a control of the low level signal transmitted from the first scan signal terminal Gate1, and in this case, the voltage of the first node N1 and the voltage of the fourth node N4 are equal. In the light-emitting phases, the scan signal transmitted from the first scan signal terminal Gate1 is a high level signal, so that the first transistor group T1 included in the compensation sub-circuit 20 is turned off under a control of the high level signal transmitted from the first scan signal terminal Gate1. The voltage of the fourth node N4 is pulled high due to the coupling effect of the capacitor Cgs or the capacitor Cgd, and in this case, the second transistor T2 is turned on under a control of a signal from the second control signal terminal Con2, so that the adjustment sub-circuit 30 transmits a voltage signal received at the reference voltage terminal Vref to the fourth node N4. For example, the voltage signal received at the reference voltage terminal Vref is of a voltage close to or equal to the voltage of the first node N1, so that a potential difference between the fourth node N4 and the first node N1 may be small or even zero, which is conducive to ensuring that the high stability of the potential of the first node N1. Thus, the luminance retention of the light-emitting device 300 in the frame is high, thereby reducing the screen flicker phenomenon of the display panel 1000.

Figure 5:
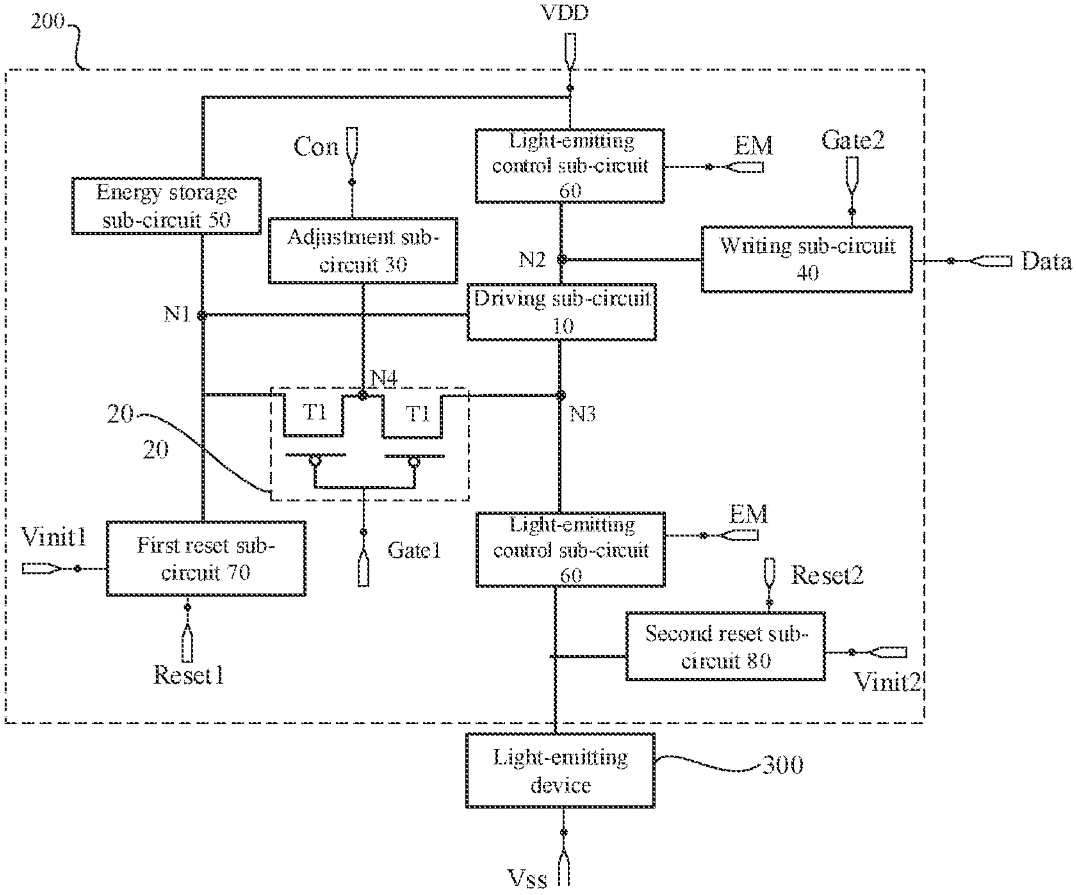
FIG. 5 is a structural diagram of another pixel circuit, in accordance with some embodiments of the present disclosure.

In some embodiments, referring to FIG. 5, the pixel circuit 200 further includes an energy storage sub-circuit 50. The energy storage sub-circuit 50 is coupled to the first node N1 and a first voltage terminal VDD. The energy storage sub-circuit 50 is configured to store and maintain the voltage of the first node N1.

In some embodiments, referring to FIG. 5 again, the pixel circuit 200 further includes a light-emitting control sub-circuit 60. The light-emitting control sub-circuit 60 is coupled to the first voltage terminal VDD, an enable signal terminal EM, the second node N2, the third node N3 and the light-emitting device 300. The light-emitting control sub-circuit 60 is configured to transmit, under a control of a signal from the enable signal terminal EM, a driving signal (driving current) to the light-emitting device 300 in cooperation with the driving sub-circuit 10.

By using the above arrangement, the light-emitting control sub-circuit 60 transmits a voltage of the first voltage terminal VDD to the second node N2 under the control of the signal from the enable signal terminal EM, and the driving sub-circuit 10 transmits the electrical signal (e.g., first voltage signal) from the second node N2 to the third node N3. The light-emitting control sub-circuit 60 may further transmit the electrical signal (e.g., first voltage signal) from the third node N3 to the light-emitting device 300. In this way, the pixel circuit 200 provides the driving signal to the light-emitting device 300. The first voltage signal may cooperate with a second voltage signal supplied from a second voltage signal terminal Vss that is coupled to the light-emitting device 300 to drive the light-emitting device 300 to emit light normally.

In some embodiments, referring to FIG. 5 again, the pixel circuit 200 further includes a first reset sub-circuit 70.

The first reset sub-circuit 70 is coupled to a first reset signal terminal Reset1, a first initialization signal terminal Vinit1 and the first node N1. The first reset sub-circuit 70 is configured to transmit an initialization signal received at the first initialization signal terminal Vinit1 to the first node N1 under a control of a first reset signal received from the first reset signal terminal Reset1.

In some examples, in the initialization phase of the image frame, the first reset sub-circuit 70 is turned on twice or more. Thus, the transmission of the initialization signal received at the first initialization signal terminal Vinit1 to the first node N1 may be performed repeatedly, so that the first node N1 may be reset more completely.

In some examples, in the initialization phase of the image frame, the first reset sub-circuit 70 and the compensation sub-circuit 20 are alternately turned on repeatedly. The first reset sub-circuit 70 transmits the initialization signal received at the first initialization signal terminal Vinit1 to the first node N1 under the control of the first reset signal received from the first reset signal terminal Reset1; and the compensation sub-circuit 20 transmits the voltage of the first node N1 to the third node N3 under the control of the scan signal transmitted from the first scan signal terminal Gate1. Thus, the first node N1 and the third node N3 are reset to prepare for a next phase. On another hand, the first reset sub-circuit 70 and the compensation sub-circuit 20 are alternately turned on repeatedly, so that the first node N1 and the third node N3 may be reseet more completely.

In some examples, referring to FIG. 5 again, the pixel circuit 200 further includes a second reset sub-circuit 80.

The second reset sub-circuit 80 is coupled to a second reset signal terminal Reset2, a second initialization signal terminal Vinit2 and the light-emitting device 300. The second reset sub-circuit 80 is configured to transmit an initialization signal received at the second initialization signal terminal Vinit2 to the light-emitting device 300 under a control of a second reset signal received from the second reset signal terminal Reset2.

It will be noted that the display panel 1000 is provided with first reset signal line(s) for transmitting respective first reset signal(s), second reset signal line(s) for transmitting respective second reset signal(s), first initialization signal line(s) for transmitting respective initialization signal(s) received by first initialization signal terminals Vinit1, and second initialization signal line(s) for transmitting respective initialization signal(s) received by second initialization signal terminals Vinit2. Based on this, the first reset signal terminal Reset1 in the pixel circuit 200 is coupled to a first reset signal line to receive a first reset signal; the second reset signal terminal Reset2 is coupled to a second reset signal line to receive a second reset signal; the first initialization signal terminal Vinit1 is coupled to a first initialization signal line to receive an initialization signal; and the second initialization signal terminal Vinit2 is coupled to a second initialization signal line to receive an initialization signal.

For example, a structure of each of the driving sub-circuit 10, the compensation sub-circuit 20, the writing sub-circuit 40, the energy storage sub-circuit 50, the light-emitting control sub-circuit 60, the first reset sub-circuit 70 and the second reset sub-circuit 80 in the pixel circuit 200 varies, which may be set according to actual needs, and is not limited in the present disclosure.

In some embodiments, referring to FIGS. 6 and 8 again, the driving sub-circuit 10 includes the driving transistor TD. A gate of the driving transistor TD is coupled to the first node N1, a first electrode of the driving transistor TD is coupled to the second node N2, and a second electrode of the driving transistor TD is coupled to the third node N3.

For example, in a case where the voltage of the first node N1 is at an active level, the driving transistor TD may be turned on under the control of the voltage of the first node N1 to transmit the electrical signal (e.g., data signal) from the second node N2 to the third node N3.

It will be noted that the "active level" in the present disclosure refers to a level at which a transistor is able to be turned on. In the case where the transistor is an N-type transistor, the "active level" is a high level, and in the case where the transistor is a P-type transistor, the "active level" is a low level. An "active level" in following embodiments is the same as the above "active level", and will not be repeated.

In some embodiments, referring to FIGS. 6 and 8 again, the writing sub-circuit 40 includes a third transistor T3.

In some examples, a gate of the third transistor T3 is coupled to the second scan signal terminal Gate2, a first electrode of the third transistor T3 is coupled to the data signal terminal Data, and a second electrode of the third transistor T3 is coupled to the second node N2.

For example, in a case where a level of the gate scan signal received at the second scan signal terminal Gate2 is an active level, the third transistor T3 may be turned on under the control of the gate scan signal to transmit the data signal supplied from the data signal terminal Data to the second node N2.

In some embodiments, referring to FIGS. 6 and 8 again, the energy storage sub-circuit 50 includes a second capacitor Cst2.

A first electrode of the second capacitor Cst2 is coupled to the first voltage terminal VDD, and a second electrode of the second capacitor Cst2 is coupled to the first node N1.

Thus, when the at least two first transistors T11 in the compensation sub-circuit 20 and the third transistor T3 in the writing sub-circuit 40 are turned on, the compensation sub-circuit 20 charges the second capacitor Cst2 while the compensation sub-circuit 20 transmits the data signal received at the data signal terminal Data to the first node N1. After the at least two first transistors T11 in the compensation sub-circuit 20 are turned off, the second capacitor Cst2 may discharge to the first node N1, so as to ensure the potential stability of the first node N1, thereby reducing the screen flicker phenomenon of the display panel 1000.

In some embodiments, referring to FIGS. 6 and 8 again, the light-emitting control sub-circuit 60 includes a fourth transistor T4 and a fifth transistor T5.

In some examples, a gate of the fourth transistor T4 is coupled to the enable signal terminal EM, a first electrode of the fourth transistor T4 is coupled to the first voltage terminal VDD, and a second electrode of the fourth transistor T4 is coupled to the second node N2.

For example, in a case where a level of a signal of the enable signal terminal EM is an active level, the fourth transistor T4 may be turned on under a control of this signal to transmit an electrical signal (e.g., first voltage signal) supplied from the first voltage terminal VDD to the second node N2.

In some examples, a gate of the fifth transistor T5 is coupled to the enable signal terminal EM, a first electrode of the fifth transistor T5 is coupled to the third node N3, and a second electrode of the fifth transistor T5 is coupled to the light-emitting device 300.

For example, in the case where the level of the signal of the enable signal terminal EM is the active level, the fifth transistor T5 may be turned on under the control of this signal to transmit the electrical signal (e.g., first voltage signal) from the third node N3 to the light-emitting device 300.

It can be understood that in a case that the adjustment sub-circuit 30 includes the first capacitor Cst1, in the writing phase, the first transistor group T1 transmits the data signal received at the data signal terminal Data to the first node N1. In this case, the signal transmitted from the first control signal terminal Con1 is a high level signal, and voltages of the two electrodes of the first capacitor Cst1 are equal. In the light-emitting phases, the scan signal transmitted from the first scan signal terminal Gate1 is the high level signal, so that the first transistor group T1 is turned off under the control of the high level signal transmitted from the first scan signal terminal Gate1, and the voltage of the fourth node N4 is pulled high due to the coupling effect of the capacitor Cgs or the capacitor Cgd. In this case, since the signal of the first control signal terminal Con1 is a low level signal, a voltage of the second electrode of the first capacitor Cst1 is reduced, so that the voltage of the fourth node N4 may be pulled down due to the coupling effect of the first capacitor Cst1 to reduce the voltage difference between the fourth node N4 and the first node N1, which is conducive to ensuring the high stability of the potential of the first node N1. Moreover, the fourth transistor T4 and the fifth transistor T5 are turned on synchronously under the control of the signal of the enable signal terminal EM, so that the electrical signal (e.g., first voltage signal) supplied from the first voltage terminal VDD is transmitted to the light-emitting device 300 sequentially through the fourth transistor T4, the driving transistor TD and the fifth transistor T5. Due to the high stability of the potential of the first node N1, the accuracy of the on state of the driving transistor TD may be ensured, so as to ensure the accuracy of the electrical signal transmitted to the light-emitting device 300, thereby effectively reducing the screen flicker phenomenon of the display panel 1000.

In a case where the adjustment sub-circuit 30 includes the second transistor T2, in the writing phase, the first transistor group T1 transmits the data signal received at the data signal terminal Data to the first node N1. In this case, the signal transmitted from the second control signal terminal Con2 is a high level signal, so that the second transistor T2 is turned off. In the light-emitting phases, the scan signal transmitted from the first scan signal terminal Gate1 is the high level signal, so that the first transistor group T1 is turned off under the control of the high level signal transmitted from the first scan signal terminal Gate1, and the voltage of the fourth node N4 is pulled high due to the coupling effect of the capacitor Cgs or the capacitor Cgd. In this case, the second transistor T2 is turned on under the control of the signal from the second control signal terminal Con2 to transmit the voltage signal received at the reference voltage terminal Vref to the fourth node N4. For example, the voltage signal received at the reference voltage terminal Vref is a voltage close to or equal to the voltage of the first node N1, so that the potential difference between the fourth node N4 and the first node N1 is small or even zero, which is conducive to ensuring the high stability of the potential of the first node N1. Moreover, the fourth transistor T4 and the fifth transistor T5 are turned on synchronously under the control of the signal of the enable signal terminal EM, so that the electrical signal (e.g., first voltage signal) supplied from the first voltage terminal VDD is transmitted to the light-emitting device 300 sequentially through the fourth transistor T4, the driving transistor TD and the fifth transistor T5. Due to high stability of the potential of the first node N1, the accuracy of the on state of the driving transistor TD may be ensured, so as to ensure the accuracy of the electrical signal transmitted to the light-emitting device 300, thereby effectively reducing the screen flicker phenomenon of the display panel 1000.

It will be noted that the schematic description is made in the above embodiments in the example where the transistors included in the circuit structures are all P-type transistors.

In some other embodiments, in the case where the transistors included in the circuit structures are all N-type transistors, the N-type transistor may be turned on under the control of the high level signal.

For example, in the writing phase, the scan signal transmitted from the first scan signal terminal Gate1 is the high level signal, the first transistor group T1 included in the compensation sub-circuit 20 is turned on under the control of the high level signal transmitted from the first scan signal terminal Gate1, and in this case, the voltage of the first node N1 and the voltage of the fourth node N4 are equal. In the light-emitting phases, the scan signal transmitted from the first scan signal terminal Gate1 is the low level signal, the first transistor group T1 included in the compensation sub-circuit 20 is turned off under the control of the low level signal transmitted from the first scan signal terminal Gate1. The voltage of the fourth node N4 is pulled down due to the coupling effect of the capacitor Cgs or the capacitor Cgd. In this case, the adjustment sub-circuit 30 pulls the voltage of the fourth node N4 up under the control of the signal(s) from the at least one control terminal Con to reduce the voltage difference between the first node N1 and the fourth node N4, so that the voltage of the fourth node N4 is equal to or substantially equal to the voltage of the first node N1. Thus, the potential stability of the first node N1 may be improved, so that the luminance retention of the light-emitting device 300 in the frame is high, thereby reducing the screen flicker phenomenon of the display panel 1000.

In some examples, referring to FIG. 6 again, in a case where the at least one control terminal Con includes the first control signal terminal Con1, the enable signal terminal EM and the first control signal terminal Con1 respond to a control of the same control signal. Thus, the structure of the pixel circuit 200 may be simplified.

In some examples, referring to FIG. 8 again, in a case where the at least one control terminal Con includes the second control signal terminal Con2 and the reference voltage terminal Vref, the enable signal terminal EM and the second control signal terminal Con2 respond to a control of the same control signal. Thus, the structure of the pixel circuit 200 may be simplified.

In some embodiments, the first reset sub-circuit includes a sixth transistor.

For example, a gate of the sixth transistor is coupled to the first reset signal terminal Reset1, a first electrode of the sixth transistor is coupled to the first initialization signal terminal Vinit1, and a second electrode of the sixth transistor is coupled to the first node N1.

For example, in a case where a level of the first reset signal received at the first reset signal terminal Reset1 is an active level, the sixth transistor may be turned on under the control of the first reset signal to receive and transmit the initialization signal received at the first initialization signal terminal Vinit1 to the first node N1, so as to reset the first node N1.

In some embodiments, referring to FIGS. 6 and 8 again, the first reset sub-circuit 70 includes a sixth transistor group T6, and the sixth transistor group T6 includes at least two sixth transistors T66 connected in series.

In some examples, gates of all the sixth transistors T66 in the sixth transistor group T6 are coupled to the first reset signal terminal Reset1, a first electrode of a first sixth transistor T66 in the sixth transistor group T6 is coupled to the first initialization signal terminal Vinit1, and a second electrode of a last sixth transistor T66 in the sixth transistor group T6 is coupled to the first node N1.

For example, in the case where the level of the first reset signal received at the first reset signal terminal Reset1 is the active level, all the sixth transistors T66 in the sixth transistor group T6 may be turned on under the control of the first reset signal to receive and transmit the initialization signal received at the first initialization signal terminal Vinit1 to the first node N1, so as to reset the first node N1.

It will be noted that in a case where the sixth transistor group T6 includes the at least two sixth transistors T66 connected in series, the risk of the electric leakage of the first node N1 from the sixth transistors T66 may be reduced, which is more conducive to ensuring the stability of the voltage of the first node N1.

In some embodiments, referring to FIGS. 6 and 8 again, the second reset sub-circuit 80 includes a seventh transistor T7.

In some examples, a gate of the seventh transistor T7 is coupled to the second reset signal terminal Reset2, a first electrode of the seventh transistor T7 is coupled to the second initialization signal terminal Vinit2, and a second electrode of the seventh transistor T7 is coupled to the light-emitting device 300.

For example, in a case where a level of the second reset signal received at the second reset signal terminal Reset2 is an active level, the seventh transistor T7 may be turned on under the control of the second reset signal to receive and transmit the initialization signal received at the second initialization signal terminal Vinit2 to the light-emitting device 300, so as to reset an anode of the light-emitting device 300.

In some embodiments, the second scan signal terminal Gate2 and the second reset signal terminal Reset2 respond to a control of the same control signal.

By using the above arrangement, the third transistor T3 and the seventh transistor T7 may the same gate signal, which simplifies the structure of the pixel circuit 200. On this basis, the gate of the third transistor T3 is coupled to the second scan signal terminal Gate2, and the gates of the first transistor group T1 are coupled to the first scan signal terminal Gate1, so that the third transistor T3 or the first transistor group T1 may be controlled to be turned on or off separately. Therefore, the pixel circuit 200 may fully reset the second node N2, the third node N3 or the fourth node N4 before and after the writing phase under the control of the scan signal transmitted from the first scan signal terminal Gate1 and/or the gate scan signal transmitted from the second scan signal terminal Gate2, thereby eliminating a problem of poor display caused by different potentials of same nodes in different pixel circuits 200.

In some embodiments, the first reset signal terminal Reset1 and the second reset signal terminal Reset2 are connected to the same reset signal terminal, which may simplify the structure of the pixel circuit 200.

It will be noted that in a case where the first reset signal terminal Reset1 and the second reset signal terminal Reset2 are connected to the same reset signal terminal, the first reset signal and the second reset signal are the same reset signals. In this case, in the initialization phase, all the sixth transistors T66 in the sixth transistor group T6 may be turned on under the control of the reset signal to receive and transmit the initialization signal received at the first initialization signal terminal Vinit1 to the first node N1, so as to reset the first node N1. Moreover, the seventh transistor T7 may be turned on under the control of the reset signal to transmit the initialization signal received from the second initialization signal terminal Vinit2 to the light-emitting device 300, so as to reset the anode of the light-emitting device 300.

In some embodiments, referring to FIGS. 9A to 9F, the display panel 1000 includes a semiconductor layer Poly and a first gate conductive layer Gt1 that are sequentially disposed on the side of the substrate 100.

For example, a material of the semiconductor layer Poly may include amorphous silicon, monocrystalline silicon, polycrystalline silicon, or a metal oxide semiconductor material.

For example, a material of the first gate conductive layer Gt1 includes conductive metal. The conductive metal may include at least one of aluminum, copper and molybdenum, which is not limited thereto in the present disclosure.

In some examples, the semiconductor layer Poly and the first gate conductive layer Gt1 are provided with a first gate insulating layer therebetween for electrically insulating the semiconductor layer Poly from the first gate conductive layer Gt1.

For example, a material of the first gate insulating layer includes any one of inorganic insulating materials of silicon nitride, silicon oxynitride and silicon oxide. The material of the first gate insulating layer may include silicon dioxide, which is not limited thereto in the present disclosure.

It will be noted that an orthographic projection of the semiconductor layer Poly on the substrate 100 is overlapped with an orthographic projection of the first gate conductive layer Gt1 on the substrate 100. Portions of the semiconductor layer Poly covered by the first gate conductive layer Gt1 respectively constitute channel portions of the transistors. Portions of the semiconductor layer Poly non-covered by the first gate conductive layer Gt1 are conductive portions each constitute a portion of a first electrode or a second electrode of a transistor. The channel portion has a channel length and a channel width.

Figure 9A:
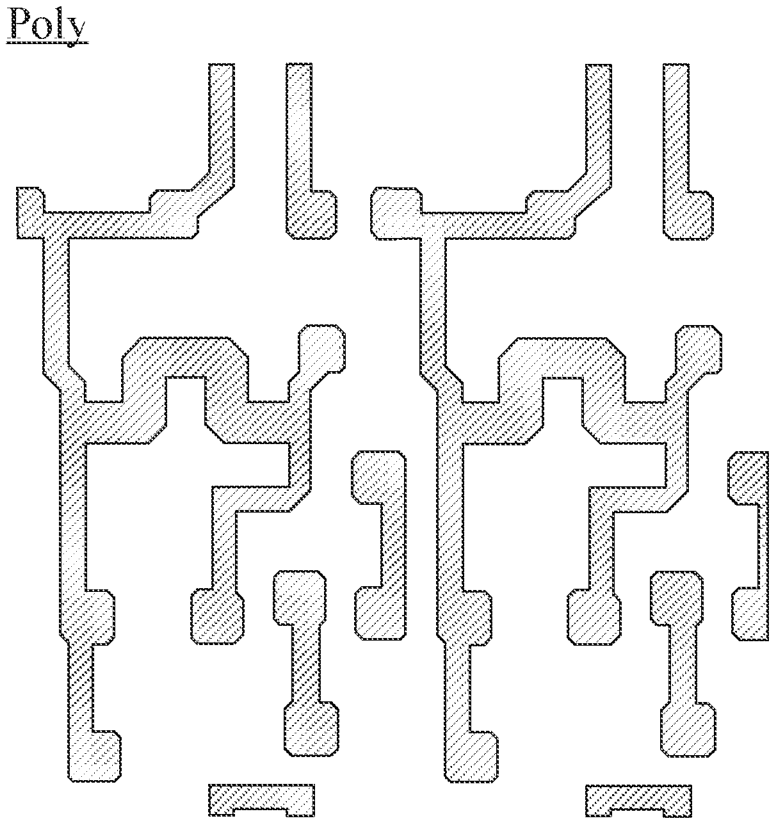
FIGS. 9A to 9F are top views of some film layers in a display panel, in accordance with some embodiments of the present disclosure.
Figure 9B:
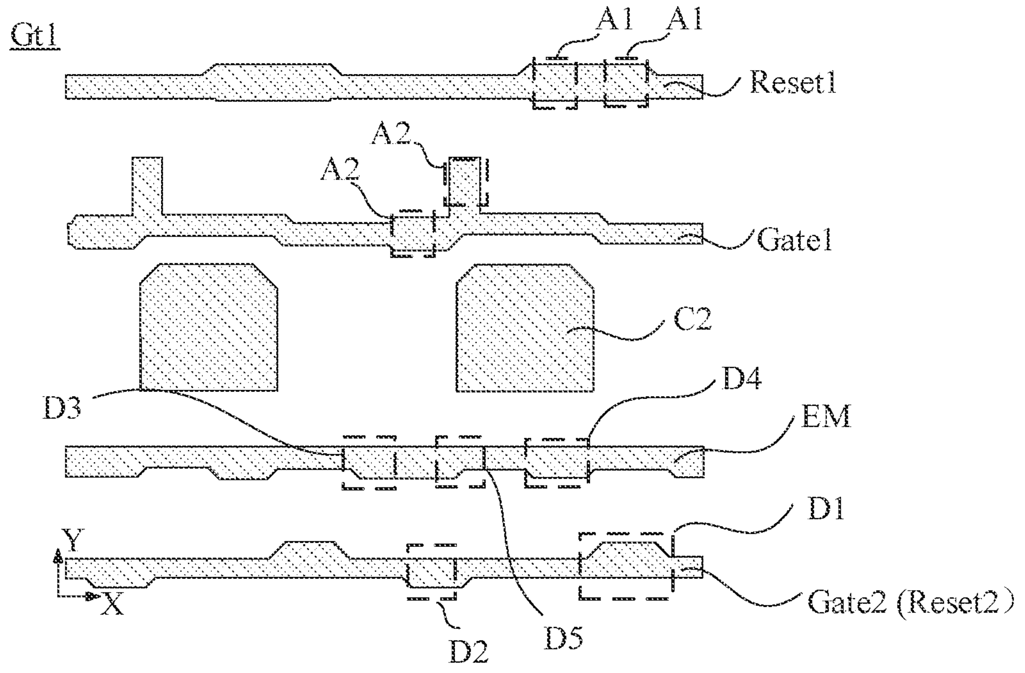
Figure 9C:
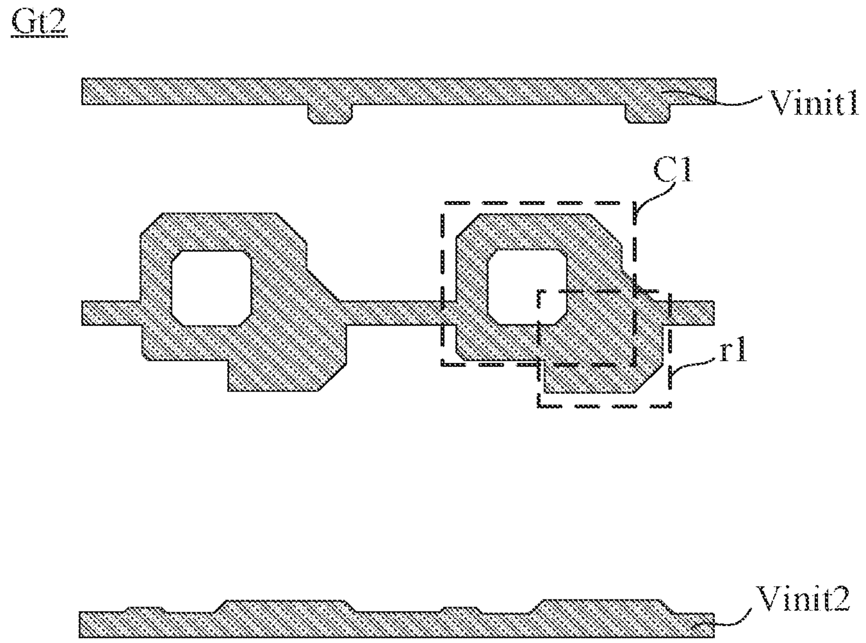
Figure 9D:
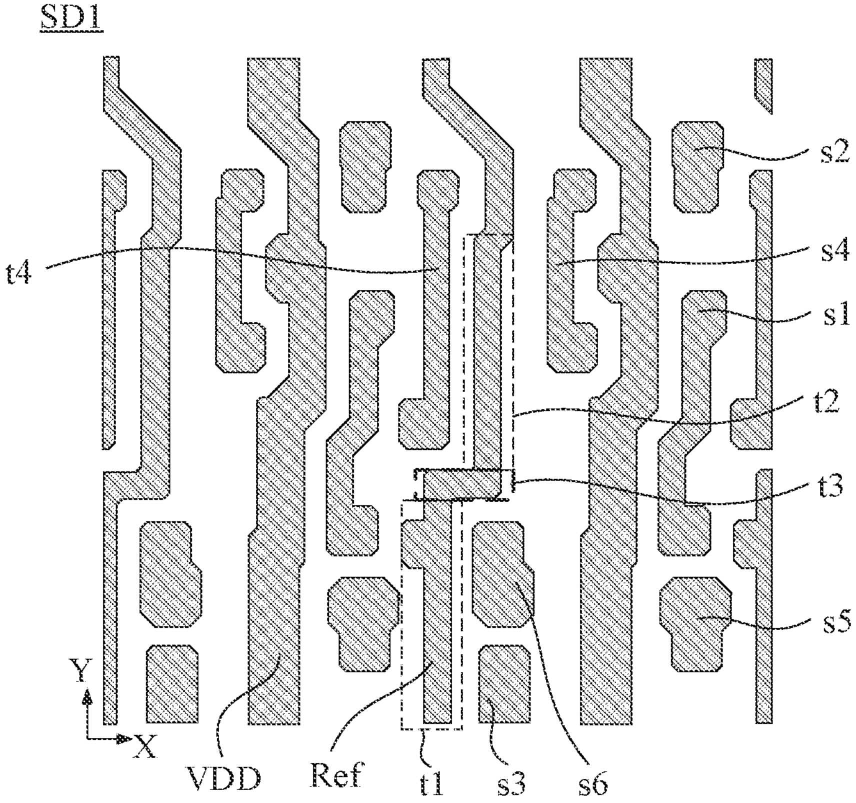
Figure 9E:
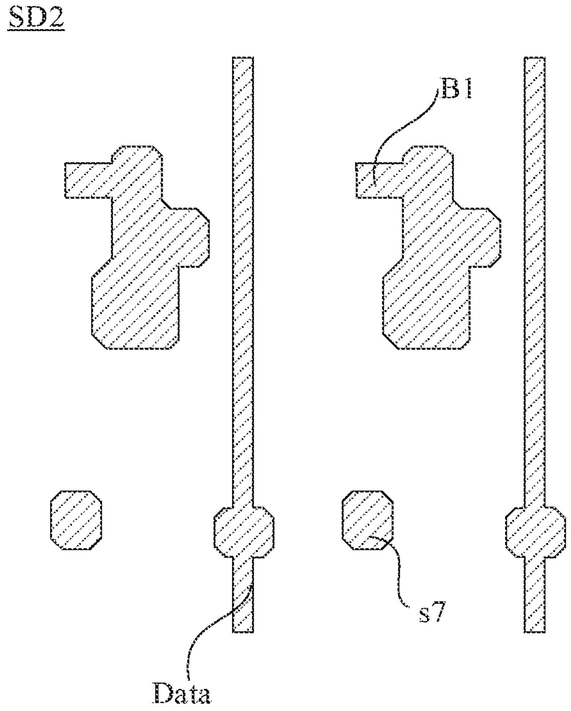
Figure 9F:
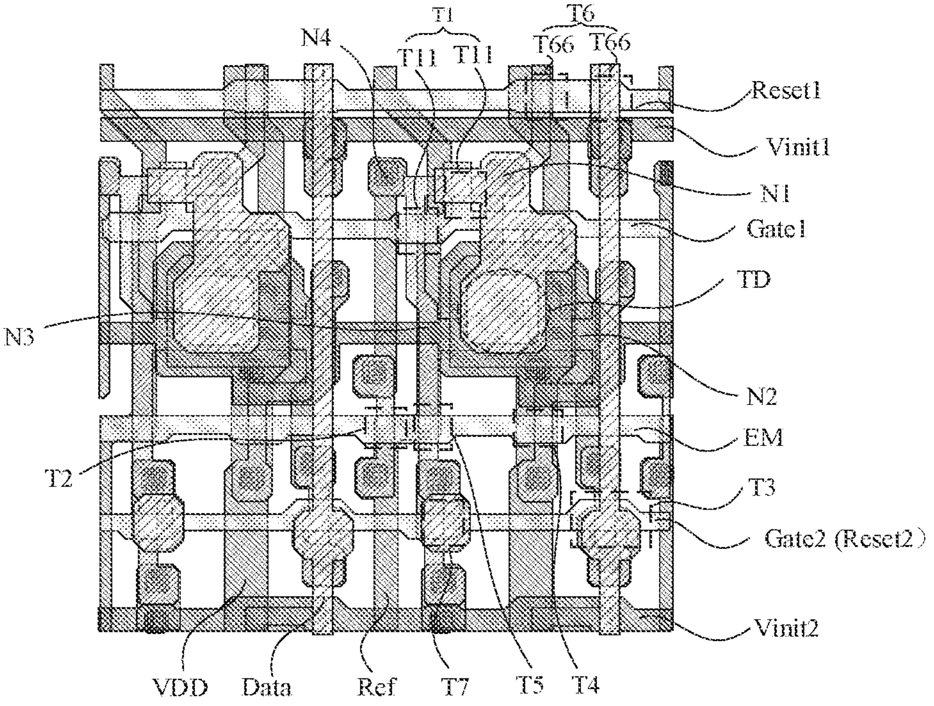

For example, as shown in FIGS. 9B and 9F, the first gate conductive layer Gt1 includes second scan signal line(s) Gate2' extending in a first direction X.

In a case where the pixel circuit 200 includes the third transistor T3 and the seventh transistor T7, the second scan signal line Gate2' includes at least a first portion D1 and a second portion D2. The first portion D1 is further used as the gate of the third transistor T3, and the second portion D2 is further used as the gate of the seventh transistor T7.

In the above arrangement, the gate of the third transistor T3 and the gate of the seventh transistor T7 are electrically connected to the second scan signal line Gate2'. The second scan signal line Gate2' connected to the gate of the third transistor T3 is further used as the second reset signal terminal Reset2 to which the gate of the seventh transistor T7 is connected. Thus, a manufacturing process of the pixel circuit 200 may be simplified, thereby simplifying a manufacturing process of the display panel 1000.

In some embodiments, referring to FIGS. 9B and 9F again, the first gate conductive layer Gt1 includes enable signal line(s) EM' extending in the first direction X.

In some examples, referring to FIGS. 9B and 9F again, in a case where the pixel circuit 200 includes the second transistor T2, the enable signal line includes at least a third portion D3. The third portion D3 is further used as the gate of the second transistor T2. Thus, the manufacturing process of the display panel 1000 is simplified.

In some embodiments, referring to FIGS. 9B and 9F again, in a case where the pixel circuit 200 includes the fourth transistor T4 and the fifth transistor T5, the enable signal line EM' further includes a fourth portion D4 and a fifth portion D5. The fourth portion D4 is further used as the gate of the fourth transistor T4, and the fifth portion D5 is further used as the gate of the fifth transistor T5.

In some examples, referring to FIG. 9F again, the gate of the second transistor T2 is located on a side of the gate of the fifth transistor T5 away from the gate of the fourth transistor T4. That is, the gate of the second transistor T2, the gate of the fourth transistor T4, and the gate of the fifth transistor T5 are arranged in the same layer.

The "same layer" herein means that a film layer for forming a specific pattern is formed by a same film forming process, and then is patterned by one patterning process using a same mask to form a layer structure. Depending on different specific patterns, the one pattering process may include several exposure, development or etching processes, and the specific patterns in the formed layer structure may be continuous or discontinuous, and these specific patterns may also be at different heights or have different thicknesses. In this way, the gate of the second transistor T2, the gate of the fourth transistor T4, and the gate of the fifth transistor T5 may be manufactured synchronously, which is conducive to simplifying the manufacturing process of the display panel 1000.

In some examples, referring to FIGS. 9B and 9F again, the first gate conductive layer Gt1 further includes the first reset signal line(s) Reset1' extending in the first direction X.

In some examples, referring to FIGS. 9B and 9F again, in a case where the pixel circuit 200 includes the sixth transistor group T6, the first reset signal line Reset1' includes at least a first sub-portion A1, and the first sub-portion A1 is further used as a gate in the sixth transistor group T6.

For example, the sixth transistor group T6 includes the at least two sixth transistors T66 connected in series. For example, the sixth transistor group T6 includes the two sixth transistors T66 connected in series, as shown in FIGS. 9B and 9F. In this case, the first reset signal line Reset1' includes two first sub-portions A1, and the two first sub-portions A1 are respectively further used as the gates of the two sixth transistors T66 in the sixth transistor group T6. Thus, the manufacturing process of the display panel 1000 is simplified.

In some examples, referring to FIGS. 9B and 9F again, in a case where the pixel circuit 200 includes the driving transistor TD and the second capacitor Cst 2, the first gate conductive layer Gt1 further includes second electrode plates C2, and the second electrode plate C2 is a lower electrode plate (i.e., the second electrode) of the second capacitor Cst2.

In some examples, the second electrode plate C2 is further used as the gate of the drive transistor TD. Thus, the manufacturing process of the display panel 1000 is simplified.

In some examples, referring to FIGS. 9B and 9F again, the first gate conductive layer Gt1 further includes first scan signal line(s) Gate1' extending in the first direction X.

In a case where the pixel circuit 200 includes the first transistor group T1, and the first transistor group T1 includes the at least two first transistors T11 connected in series, the first scan signal line Gate1' includes at least a second sub-portion A2, and the second sub-portion A2 is further used as a gate in the first transistor group T1.

For example, the first transistor group T1 includes the at least two first transistors T11 connected in series. For example, the first transistor group T1 includes the two first transistors T11 connected in series, as shown in FIGS. 9B and 9F. In this case, the first scan signal line Gate1' includes two second sub-portions A2, and the two second sub-portions A2 are respectively further used as the gates of the two first transistors T11 in the first transistor group T1. Thus, the manufacturing process of the display panel 1000 is simplified.

For example, referring to FIG. 9F again, the fourth node N4 is formed between the second electrode of the first first transistor T11 in the first transistor group T1 and the first electrode of the second first transistor T11 in the first transistor group T1.

In some embodiments, referring to FIGS. 9C, 9D and 9F, the display panel 1000 further includes a second gate conductive layer Gt2 located on a side of the first gate conductive layer Gt1 away from the substrate 100, and a first source-drain conductive layer SD1 located on a side of the second gate conductive layer Gt2 away from the substrate 100.

In some examples, the second gate conductive layer Gt2 may be made of the same material as the first gate conductive layer Gt1. In some other examples, the second gate conductive layer Gt2 may be made of a different material from the first gate conductive layer Gt1, which is not limited in the embodiments of the present disclosure.

In some examples, the second gate conductive layer Gt2 and the first gate conductive layer Gt1 are provided with a second gate insulating layer therebetween for electrically insulating the second gate conductive layer Gt2 from the first gate conductive layer Gt1.

For example, a material of the second gate insulating layer includes any one of inorganic insulating materials of silicon nitride, silicon oxynitride and silicon oxide. The material of the second gate insulating layer may include silicon dioxide, which is not limited thereto.

In some examples, the second gate conductive layer Gt2 and the first source-drain conductive layer SD1 are provided with a third gate insulating layer therebetween.

For example, a material of the third gate insulating layer includes any one of inorganic insulating materials of silicon nitride, silicon oxynitride and silicon oxide. The material of the third gate insulating layer may include silicon dioxide, which is not limited thereto.

In some examples, referring to FIGS. 9D and 9F again, the first source-drain conductive layer SD1 includes reference voltage lines Ref extending in a second direction Y.

For example, the second direction Y and the first direction X intersect. Here, an included angle between the first direction X and the second direction Y may be set according to actual needs. For example, the included angle between the first direction X and the second direction Y is 85°, 88°, or 90°.

In some examples, referring to FIG. 9F again, an orthographic projection of the reference voltage line Ref on the substrate 100 is at least partially overlapped with an orthographic projection of the gate of the second transistor T2 on the substrate 100.

It will be noted that the "orthographic projection of the reference voltage line Ref on the substrate 100 is at least partially overlapped with the orthographic projection of the gate of the second transistor T2 on the substrate 100", which means that the orthographic projection of the reference voltage line Ref on the substrate 100 is partially overlapped with or is entirely overlapped with the orthographic projection of the gate of the second transistor T2 on the substrate 100.

In these embodiments, the orthographic projection of the reference voltage line Ref on the substrate 100 is at least partially overlapped with the orthographic projection of the gate of the second transistor T2 on the substrate 100, so that a region through which light can pass is enlarged, thereby greatly improving a light transmittance of the display panel 1000.

In some examples, an overlapping area of the orthographic projection of the reference voltage line Ref on the substrate 100 and an orthographic projection of the fourth node N4 on the substrate 100 is less than 50% of an area of the orthographic projection of the fourth node N4 on the substrate 100.

In some embodiments, referring to FIGS. 9D and 9F again, the reference voltage line Ref includes a first body portion t1 and a second body portion t2 each extending in the second direction Y.

In some examples, referring to FIGS. 9D and 9F again, the reference voltage line Ref further includes a first connection portion t3 connected between the first body portion t1 and the second body portion t2 and extending in the first direction X.

An orthographic projection of an end of the first connection portion t3 on the substrate 100 is overlapped with the orthographic projection of the gate of the second transistor T2 on the substrate 100, and an orthographic projection of another end of the first connection portion t3 on the substrate 100 is overlapped with an orthographic projection of the gate of the fifth transistor T5 on the substrate 100. Thus, an orthographic projection of the first connection portion t3 on the substrate 100 falls within an orthographic projection of the enable signal line EM' on the substrate 100, so that the region through which light can pass is further enlarged, thereby greatly improving the light transmittance of the display panel 1000.

In some embodiments, referring to FIG. 9F again, the orthographic projection of the reference voltage line Ref on the substrate 100 is at least partially overlapped with the orthographic projection of the gate of the fifth transistor T5 on the substrate 100.

In some embodiments, the orthographic projection of the reference voltage line Ref on the substrate 100 is at least partially overlapped with orthographic projections of the gates in the first transistor group T1 on the substrate 100.

In some embodiments, referring to FIGS. 9D and 9F, the first source-drain conductive layer SD1 further includes first connection line(s) t4. The first electrode of the second transistor T2 is coupled to the reference voltage line Ref, and the second electrode of the second transistor T2 is coupled to the fourth node N4 through a first connection line t4.

In some examples, the reference voltage line Ref is electrically connected to the first electrode of the second transistor T2 through a via, and the second electrode of the second transistor T2 is electrically connected to the first connection line t4 through a via.

After a voltage signal received from the reference voltage line Ref is transmitted to the second transistor T2, the voltage signal is transmitted to the fourth node N4 through the first connection line t4, so that the voltage of the fourth node N4 is adjusted.

For example, in the light-emitting phases, the voltage signal received from the reference voltage line Ref is a voltage close to or equal to the voltage of the first node N1.

After the voltage signal received from the reference voltage line Ref is transmitted to the second transistor T2, the voltage signal is transmitted to the fourth node N4 through the first connection line t4, so that the potential difference between the fourth node N4 and the first node N1 may be small or even zero. Therefore, this is conducive to ensuring the high stability of the potential of the first node N1, so that the luminance retention of the light-emitting device 300 in the frame is high, thereby reducing the screen flicker phenomenon of the display panel 1000.

In some examples, referring to FIGS. 9D and 9F, the reference voltage line Ref is bent in the first direction X, so that the orthographic projection of the reference voltage line Ref on the substrate 100 is non-overlapped with an orthographic projection of the first connection line t4 on the substrate 100.

In some embodiments, referring to FIG. 9F, in a case where the pixel circuit 200 further includes the driving transistor TD, the gate of the driving transistor TD is coupled to the first node N1, and the first electrode of the driving transistor TD is coupled to the second node N2.

In some examples, referring to FIGS. 9D and 9F, the first source-drain conductive layer SD1 further includes first voltage signal lines VDD' extending in the second direction Y.

In some examples, referring to FIGS. 9D and 9F, an orthographic projection of the first voltage signal line VDD' on the substrate 100 is at least partially overlapped with an orthographic projection of the gate of the driving transistor TD on the substrate 100.

In some examples, referring to FIGS. 9D and 9F, the orthographic projection of the first voltage signal line VDD' on the substrate 100 is at least partially overlapped with an orthographic projection of the gate of the fourth transistor T4 on the substrate 100.

In these embodiments, the orthographic projection of the first voltage signal line VDD' on the substrate 100 is at least partially overlapped with the orthographic projection of the gate of the driving transistor TD on the substrate 100, and is at least partially overlapped with the orthographic projection of the gate of the fourth transistor T4 on the substrate 100, so that the region through which light can pass may be further enlarged, thereby greatly improving the light transmittance of the display panel 1000.

In some embodiments, referring to FIGS. 9C and 9F, the second gate conductive layer Gt2 includes the first initialization signal line(s) Vinit1' extending in the first direction X.

In some examples, the sixth transistor group T6 is electrically connected to the first initialization signal line Vinit1' through a transfer device.

For example, referring to FIGS. 9D and 9F, the first source-drain conductive layer SD1 further includes second transfer device(s) s2.

For example, the first electrode of the first sixth transistor T66 in the sixth transistor group T6 is coupled to the second transfer device s2 through a via, and the first initialization signal line Vinit1' is coupled to the second transfer device s2 through a via. Thus, the sixth transistor group T6 is electrically connected to the first initialization signal line Vinit1' through the second transfer device s2.

In some examples, referring to FIGS. 9C and 9F again, the second gate conductive layer Gt2 further includes the second initialization signal line(s) Vinit2' extending in the first direction X.

In some examples, the seventh transistor T7 is electrically connected to the second initialization signal line Vinit2' through a via.

For example, referring to FIGS. 9D and 9F, the first source-drain conductive layer SD1 further includes third transfer device(s) s3.

For example, the first electrode of the seventh transistor T7 is coupled to the third transfer device s3 through a via, and the second initialization signal line Vinit2' is coupled to the third transfer device s3 through a via. Thus, the seventh transistor T7 is electrically connected to the second initialization signal line Vinit2' through the third transfer device s3.

In some embodiments, referring to FIGS. 9C and 9F again, the second gate conductive layer Gt2 further includes first electrode plates C1, and the first electrode plate C1 is an upper electrode plate (i.e., the first electrode) of the second capacitor Cst2.

In some examples, referring to FIGS. 9B, 9C and 9F again, an orthographic projection of the first electrode plate C1 on the substrate 100 is partially overlapped with an orthographic projection of the second electrode plate C2 on the substrate 100.

In some examples, referring to FIGS. 9C and 9F, the second gate conductive layer Gt2 further includes shielding portions r1.

In some examples, an orthographic projection of the shielding portion r1 on the substrate 100 is partially overlapped with an orthographic projection of the second node N2 on the substrate 100, and the shielding portion r1 is electrically connected to the first voltage signal line VDD' through a via.

For example, the shielding portion r1 and the first electrode plate C1 are of an integral structure. The shielding portion r1 is electrically connected to the first voltage signal line VDD' through the via.

In these embodiments, the second node N2 is shielded by the shielding portion r1. In this way, it is possible to avoid a parasitic capacitance generated between a film layer located on a side of the shielding portion r1 away from the substrate 100 and the second node N2, which interferes with the signal transmitted by the second node N2 and a signal transmitted by the film layer. Moreover, the shielding portion r1 is connected to the first voltage signal line VDD' through the via, and the signal transmitted from the first voltage signal line VDD' is a constant voltage signal, so that the constant voltage signal may exist on the shielding portion r1, and the signal of the second node N2 is prevented from being affected, thereby further improving the voltage stability of the first node N1, so as to improve a signal transmission stability of the pixel circuit 200.

In some examples, first electrode plates C1 in adjacent pixel circuits 200 in a same row are electrically connected to each other, so that the first voltage signal lines VDD' connected to the pixel circuits 200 in the display panel 100 have a grid structure. That is, first voltage signal lines' VDD connected to adjacent pixel circuits 200 are electrically connected through the first electrode plates C1 in the first direction X. Moreover, the first voltage signal line VDD' extends in the second direction Y, so that a voltage drop may be reduced, so as to improve a display uniformity of the display panel 1000.

In some examples, referring to FIGS. 9D and 9F again, the first source-drain conductive layer SD1 further includes first transfer devices s1. The second electrode of the third transistor T3 is coupled to the second node N2 through the first transfer device s1.

In some examples, referring to FIGS. 9D and 9F again, the first source-drain conductive layer SD1 further includes fourth transfer devices s4.

For example, the gate of the drive transistor TD is coupled to the fourth transfer device s4 through a via, and the first node N1 is coupled to the fourth transfer device s4 through a via. Thus, the gate electrode of the driving transistor TD is electrically connected to the first node N1 through the fourth transfer device s4.

In some other examples, referring to FIGS. 9E and 9F, the display panel 1000 further includes a second source-drain conductive layer SD2 located on a side of the first source-drain conductive layer SD1 away from the second gate conductive layer Gt2.

In some examples, the second source-drain conductive layer SD2 and the first source-drain conductive layer SD1 are provided with a fourth gate insulating layer therebetween for electrically insulating the first source-drain conductive layer SD1 from the second source-drain conductive layer SD2.

For example, a material of the fourth gate insulating layer includes any one of inorganic insulating materials of silicon nitride, silicon oxynitride and silicon oxide. The material of the fourth gate insulating layer may include silicon dioxide, which is not limited thereto.

In some embodiments, referring to FIGS. 9E and 9F, the second source-drain conductive layer SD2 includes data signal lines Data' extending in the second direction Y.

In some examples, referring to FIG. 9F again, a reference voltage line Ref and a data signal line Data' that are connected to a same column of pixel circuits are respectively located on two sides of a first voltage signal line VDD'.

By using the above arrangement, the first voltage signal lines VDD' are located in the first source-drain conductive layer SD1, and the data signal lines Data' are located in the second source-drain conductive layer SD2. Since the first source-drain conductive layer SD1 and the second source-drain conductive layer SD2 are provided with the fourth gate insulating layer therebetween, there is a small parasitic capacitance between the first voltage signal line VDD' and the data signal line Data', so that a parasitic capacitance of the data signal line Data' is reduced, which is more conducive to data writing and high-frequency display, thereby improving the display performance of the display panel 1000.

In some examples, referring to FIGS. 9D and 9F again, the first source-drain conductive layer SD1 further includes fifth transfer devices s5.

For example, the first electrode of the third transistor T3 is coupled to the fifth transfer device s5 through a via, and the data signal line Data' is coupled to the fifth transfer device s5 through a via. Thus, the third transistor T3 is electrically connected to the data signal line Data' through the fifth transfer device s5.

In some examples, referring to FIGS. 9D, 9E and 9F again, the first source-drain conductive layer SD1 further includes sixth transfer devices s6, and the second source-drain conductive layer SD2 further includes seventh transfer devices s7.

For example, the second electrode of the fifth transistor T5 is coupled to the sixth transfer device s6 through a via, and the sixth transfer device s6 may further be coupled to the seventh transfer device s7 through a via. On this basis, the seventh transfer device s7 may further be coupled to the anode of the light-emitting device 300 through a via. Thus, the second electrode of the fifth transistor T5 is electrically connected to the anode of the light-emitting device 300 through the sixth transfer device s6 and the seventh transfer device s7.

In some examples, referring to FIGS. 9E and 9F again, the second source-drain conductive layer SD2 further includes shielding members B1. The shielding member B1 is connected to the first voltage signal line VDD' through a via, and an orthographic projection of the shielding member on the substrate 100 is overlapped with an orthographic projection of the first node N1 on the substrate 100.

By using the above arrangement, the shielding member B1 may cover the first node N1 completely to shield the first node N1. In this way, it is possible to avoid a parasitic capacitance generated between a film layer located on a side of the shielding member B1 away from the substrate 100 and the first node N1, which interferes with the signal transmitted by the first node N1 and a signal transmitted by the film layer. Moreover, the shielding member B1 is connected to the first voltage signal line VDD' through the via, and the signal transmitted from the first voltage signal line VDD' is a constant voltage signal, so that the constant voltage signal may exist on the shielding member B1, and the signal of the first node N1 is prevented from being affected, thereby further improving the voltage stability of the first node N1, so as to improve the signal transmission stability of the pixel circuit 200.

In some examples, in a case where the pixel circuit 200 includes the first capacitor Cst1, the first electrode of the first capacitor Cst1 is located in the first gate conductive layer Gt1, and the second electrode of the first capacitor Cst1 is located in the second gate conductive layer Gt2. Thus, the manufacturing process of the display panel 1000 is simplified, and the first capacitor Cst1 may be set on a basis of not increasing a mask process flow, thereby reducing the voltage difference between the fourth node N4 and the first node N1 by using the first capacitor Cst1 to pull down the voltage of the fourth node N4. Therefore, this is conducive to ensuring the high stability of the potential of the first node N1 and avoiding affecting the operation of the pixel circuit 200, thereby reducing the screen flicker phenomenon of the display panel 1000.

Some embodiments of the present disclosure further provide a driving method of a pixel circuit, and the driving method is applied to the pixel circuit 200 in any one of the above embodiments.

Figure 10:
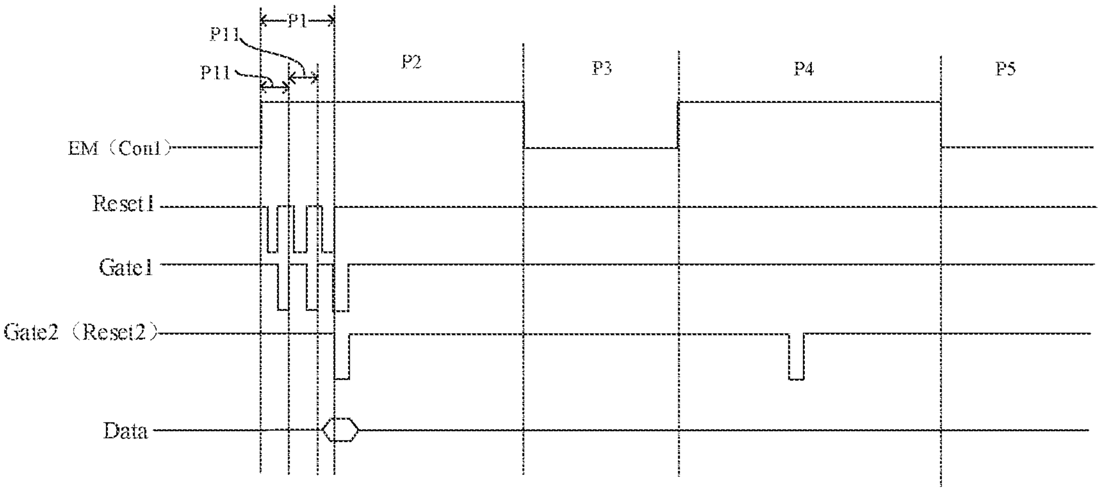
FIG. 10 is a timing diagram of a pixel circuit, in accordance with some embodiments of the present disclosure.

Referring to FIG. 10, the driving method includes the writing phase P2, the first light-emitting phase P3, the adjustment phase P4 and the second light-emitting phase P5.

In the writing phase P2, the writing sub-circuit 40 transmits the data signal received at the data signal terminal Data to the second node N2 under the control of the gate scan signal received from the second scan signal terminal Gate2; the driving sub-circuit 10 transmits the data signal from the second node N2 to the third node N3; and the compensation sub-circuit 20 transmits the data signal from the third node N3 to the first node N1.

In the first light-emitting phase P3, the adjustment sub-circuit 30 adjusts the voltage of the fourth node N4 under the control of the signal(s) from the at least one control terminal Con to reduce the voltage difference between the fourth node N4 and the first node N1; and under the control of the signal from the enable signal terminal EM, the light-emitting control sub-circuit 60 transmits the voltage signal supplied from the first voltage terminal VDD to the light-emitting device 300 in cooperation with the driving sub-circuit 10, so as to drive the light-emitting device 300 to emit light.

In the adjustment phase P4, the writing sub-circuit 40 transmits the data signal received at the data signal terminal Data to the second node N2 under the control of the gate scan signal received from the second scan signal terminal Gate2 to reset the second node N2.

In the second light-emitting phase P5, the adjustment sub-circuit 30 adjusts the voltage of the fourth node N4 under the control of the signal(s) from the at least one control terminal Con to reduce the voltage difference between the fourth node N4 and the first node N1; and under the control of the signal from the enable signal terminal EM, the light-emitting control sub-circuit 60 transmits the voltage signal supplied from the first voltage terminal VDD to the light-emitting device 300 in cooperation with the driving sub-circuit 10, so as to drive the light-emitting device 300 to emit light.

In the driving method of the pixel circuit 200 provided in some embodiments of the present disclosure, in the light-emitting phases (including the first light-emitting phase and the second light-emitting phase), the adjustment sub-circuit 30 adjusts the voltage of the fourth node N4 under the control of the signal(s) from the at least one control terminal Con to reduce the voltage difference between the fourth node N4 and the first node N1, so that the voltage of the fourth node N4 is equal to or substantially equal to the voltage of the first node N1. Thus, the potential stability of the first node N1 may be improved, so that the luminance retention of the light-emitting device 300 in the frame is high, thereby reducing the screen flicker phenomenon of the display panel 1000. Moreover, the second node N2 is reset in the adjustment phase, so that it is possible to effectively counteract the hysteresis effect of the driving transistor TD, so as to improve the luminance retention in the frame, thereby reducing the screen flicker phenomenon of the display panel 1000 at the low frequency.

In some embodiments, referring to FIG. 10 again, the driving method further includes the initialization phase P1.

The initialization phase P1 includes at least two reset sub-phases P11.

In the reset sub-phases P11, the first reset sub-circuit 70 transmits the initialization signal received at the first initialization signal terminal Vinit1 to the first node N1 under the control of the first reset signal received from the first reset signal terminal Reset1; and the compensation sub-circuit 20 transmits the voltage of the first node N1 to the third node N3 under the control of the scan signal transmitted from the first scan signal terminal Gate1.

In these embodiments, the first node N1 and the third node N3 are reset through the reset sub-phase P11 to prepare for a next phase. On another hand, the first node N1 and the third node N3 may be reset more completely through the at least two reset sub-phases P11.

The driving method of the pixel circuit 200 will be exemplarily described below by taking the pixel circuit structure shown in FIG. 6 and the timing diagram shown in FIG. 10 in the embodiments of the present disclosure as an example.

For example, the transistors in the pixel circuit 200 shown in FIG. 6 are all P-type transistors. The P-type transistor may be turned on under a control of a low level signal. The enable signal terminal EM is further used as the first control signal terminal Con1.

For example, in the initialization phase P1, as shown in FIG. 10, the initialization phase P1 includes at least two reset sub-phases P11.

Firstly, in the reset sub-phase P11, a level of the enable signal supplied from the enable signal terminal EM is a high level, e.g., a voltage of the enable signal is 7V. A level of the second reset signal supplied from the second reset signal terminal Reset2 is a high level, e.g., a voltage of the second reset signal is 7V. A level of the first reset signal supplied from the first reset signal terminal Reset1 is a low level, e.g., a voltage of the first reset signal is −7V. A level of the scan signal supplied from the first scan signal terminal Gate1 is a high level, e.g., a voltage of the scan signal is 7V. A level of the gate scan signal supplied from the second scan signal terminal Gate2 is a high level, e.g., a voltage of the gate scan signal is 7V. The initialization signal supplied from the first initialization signal terminal Vinit1 and the initialization signal supplied from the second initialization signal terminal Vinit2 are direct current low level signals, e.g., voltages of the initialization signals each are −3V.

In this case, the first transistor group T1 in the compensation sub-circuit, the third transistor T3 in the writing sub-circuit 40, the seventh transistor T7 in the second reset sub-circuit 80, and the fourth transistor T4 and the fifth transistor T5 in the light-emitting control sub-circuit 60 are turned off.

All the sixth transistors T66 in the first reset sub-circuit 70 are turned on to transmit the initialization signal received at the first initialization signal terminal Vinit1 to the first node N1, so as to reset the first node N1.

Then, the level of the first reset signal supplied from the first reset signal terminal Reset1 is changed from the low level to a high level, e.g., the voltage of the first reset signal is 7V. The level of the scan signal supplied from the first scan signal terminal Gate1 is changed from the high level to a low level, e.g., the voltage of the scan signal is −7V. The other signals become unchanged.

In this case, all the sixth transistors T66 in the first reset sub-circuit 70, the third transistor T3 in the writing sub-circuit 40, the seventh transistor T7 in the second reset sub-circuit 80, and the fourth transistor T4 and the fifth transistor T5 in the light-emitting control sub-circuit 60 are turned off.

The first transistor group T1 in the compensation sub-circuit is turned on to transmit the voltage of the first node N1 to the third node N3, so as to reset the third node N3.

In the writing phase P2, the level of the enable signal supplied from the enable signal terminal EM is a high level, e.g., the voltage of the enable signal is 7V. The level of the second reset signal supplied from the second reset signal terminal Reset2 is a low level, e.g., the voltage of the second reset signal is −7V. The level of the first reset signal supplied from the first reset signal terminal Reset1 is a high level, e.g., the voltage of the first reset signal is 7V. The level of the scan signal supplied from the first scan signal terminal Gate1 is a low level, e.g., the voltage of the scan signal is −7V. The level of the gate scan signal supplied from the second scan signal terminal Gate2 is a low level, e.g., the voltage of the gate scan signal is −7V.

In the writing phase P2, all the sixth transistors T66 in the first reset sub-circuit 70, and the fourth transistor T4 and the fifth transistor T5 in the light-emitting controlling sub-circuit 60 are turned off.

The third transistor T3 in the writing sub-circuit 40 is turned on to write the data signal supplied from the data signal terminal Data into the second node N2, and the data signal of the second node N2 is written into the third node N3 through the driving transistor TD in the driving sub-circuit 10. The data signal of the third node N3 is compensated for the first node N1 through the first transistor group T1 in the compensation sub-circuit 20. The potential of the first node N1 is gradually increased from −3V to a sum of Vdata and Vth (i.e., Vdata+Vth). Vdata is a voltage value of the data signal supplied from the data signal terminal Data, and Vth is a threshold voltage of the driving transistor TD in the driving sub-circuit 10. After the potential of the first node N1 is gradually increased from −3V to Vdata+Vth, the driving transistor TD in the driving sub-circuit 10 is turned off, and the first node N1 and the second capacitor Cst2 are charged. In addition, the seventh transistor T7 in the second reset sub-circuit 80 is turned on to transmit the initialization signal received at the second initialization signal terminal Vinit2 to the light-emitting device 300, so as to reset the anode of the light-emitting device 300.

It will be noted that, in the writing phase P2, the voltages of the two electrodes of the first capacitor Cst1 are equal.

In the first light-emitting phase P3, the level of the enable signal supplied from the enable signal terminal EM is a low level, e.g., the voltage of the enable signal is −7V. The level of the second reset signal supplied from the second reset signal terminal Reset2 is a high level, e.g., the voltage of the second reset signal is 7V. The level of the first reset signal supplied from the first reset signal terminal Reset1 is a high level, e.g., the voltage of the first reset signal is 7V. The level of the scan signal supplied from the first scan signal terminal Gate1 is a high level, e.g., the voltage of the scan signal is 7V. The level of the gate scan signal supplied from the second scan signal terminal Gate2 is a high level, e.g., the voltage of the gate scan signal is 7V. The enable signal terminal EM is further used as the first control signal terminal Con1.

The first transistor group T1 is turned off under the control of the high level signal transmitted from the first scan signal terminal Gate1, and the voltage of the fourth node N4 is pulled high due to the coupling effect of the capacitor Cgs or the capacitor Cgd. In this case, since the signal of the first control signal terminal Con1 is a low level signal, the voltage of the second electrode of the first capacitor Cst1 is reduced, so that the voltage of the fourth node N4 may be pulled down due to the coupling effect of the first capacitor Cst1, so as to reduce the voltage difference between the fourth node N4 and the first node N1, which is conducive to ensuring the high stability of the potential of the first node N1.

All the sixth transistors T66 in the first reset sub-circuit 70, the seventh transistor T7 in the second reset sub-circuit 80, the third transistor T3 in the writing sub-circuit 40, and the first transistor group T1 in the compensation sub-circuit are turned off.

The fourth transistor T4 and the fifth transistor T5 in the light-emitting control sub-circuit 60 are turned on, so that the electrical signal (e.g., first voltage signal) supplied from the first voltage terminal VDD is written into the second node N2. The driving transistor TD in the driving sub-circuit 10 writes the first voltage signal of the second node N2 into the third node N3. The first voltage signal of the third node N3 is written into the light-emitting device 300 through the fifth transistor T5 in the light-emitting control sub-circuit 60, so that the light-emitting device 300 emits light due to an action of the first voltage signal and the second voltage signal supplied from the second voltage signal terminal Vss. Due to the high stability of the potential of the first node N1, the accuracy of the on state of the driving transistor TD may be ensured, so as to ensure the accuracy of the electrical signal transmitted to the light-emitting device 300, thereby effectively reducing the screen flicker phenomenon of the display panel 1000.

In the adjustment phase P4, the level of the enable signal supplied from the enable signal terminal EM is a high level, e.g., the voltage of the enable signal is 7V. The level of the second reset signal supplied from the second reset signal terminal Reset2 is a low level, e.g., the voltage of the second reset signal is −7V. The level of the first reset signal supplied from the first reset signal terminal Reset1 is a high level, e.g., the voltage of the first reset signal is 7V. The level of the scan signal supplied from the first scan signal terminal Gate1 is a high level, e.g., the voltage of the scan signal is 7V. The level of the gate scan signal supplied from the second scan signal terminal Gate2 is a low level, e.g., the voltage of the gate scan signal is −7V.

All the sixth transistors T66 in the first reset sub-circuit 70, the first transistor group T1 in the compensation sub-circuit, and the fourth transistor T4 and the fifth transistor T5 in the light-emitting control sub-circuit 60 are turned off.

The third transistor T3 in the writing sub-circuit 40 is turned on to write the data signal supplied from the data signal terminal Data into the second node N2, so as to reset the second node N2. The seventh transistor T7 in the second reset sub-circuit 80 is turned on to transmit the initialization signal received at the second initialization signal terminal Vinit2 to the light-emitting device 300, so as to reset the anode of the light-emitting device 300.

In the second light-emitting phase P5, the level of the enable signal supplied from the enable signal terminal EM is a low level, e.g., the voltage of the enable signal is −7V. The level of the second reset signal supplied from the second reset signal terminal Reset2 is a high level, e.g., the voltage of the second reset signal is 7V. The level of the first reset signal supplied from the first reset signal terminal Reset1 is a high level, e.g., the voltage of the first reset signal is 7V. The level of the scan signal supplied from the first scan signal terminal Gate1 is a high level, e.g., the voltage of the scan signal is 7V. The level of the gate scan signal supplied from the second scan signal terminal Gate2 is a high level, e.g., the voltage of the gate scan signal is 7V. The enable signal terminal EM is further used as the first control signal terminal Con1.

The first transistor group T1 is turned off under the control of the high level signal transmitted from the first scan signal terminal Gate1, and the voltage of the fourth node N4 is pulled high due to the coupling effect of the capacitor Cgs or the capacitor Cgd. In this case, since the signal of the first control signal terminal Con1 is a low level signal, the voltage of the second electrode of the first capacitor Cst1 is reduced, so that the voltage of the fourth node N4 may be pulled down due to the coupling effect of the first capacitor Cst1, so as to reduce the voltage difference between the fourth node N4 and the first node N1, which is conducive to ensuring the high stability of the potential of the first node N1.

All the sixth transistors T66 in the first reset sub-circuit 70, the seventh transistor T7 in the second reset sub-circuit 80, the third transistor T3 in the writing sub-circuit 40, and the first transistor group T1 in the compensation sub-circuit are turned off.

The fourth transistor T4 and the fifth transistor T5 in the light-emitting control sub-circuit 60 are turned on, so that the electrical signal (e.g., first voltage signal) supplied from the first voltage terminal VDD is written into the second node N2. The driving transistor TD in the driving sub-circuit 10 writes the first voltage signal of the second node N2 into the third node N3. The first voltage signal of the third node N3 is written into the light-emitting device 300 through the fifth transistor T5 in the light-emitting control sub-circuit 60, so that the light-emitting device 300 emits light due to the action of the first voltage signal and the second voltage signal supplied from the second voltage signal terminal Vss. Due to the high stability of the potential of the first node N1, the accuracy of the on state of the driving transistor TD may be ensured, so as to ensure the accuracy of the electrical signal transmitted to the light-emitting device 300, thereby effectively reducing the screen flicker phenomenon of the display panel 1000.

It will be noted that in the light-emitting phase (which may be the first light-emitting phase or the second light-emitting phase), the driving current flowing through the driving transistor TD is determined by a voltage difference between the gate of the driving transistor TD and the first electrode of the driving transistor TD.

For example, when the writing phase P2 is finished, the potential of the first node N1 is Vdata+Vth.

In the light-emitting phase (which may be the first light-emitting phase or the second light-emitting phase), the voltage difference Vgs of the gate and the first electrode of the driving transistor TD satisfies a condition that Vgs=VG−VS=Vdata+Vth−VDD", and the driving current $I_{oled}$ flowing through the driving transistor TD is as follows.

$$
\begin{aligned}
I_{oled} &= K(Vgs - V_{th})^2 \\
&= K(Vdata + Vth - VDD'' - V_{th})^2 \\
&= K(Vdata - VDD'')^2
\end{aligned}
$$

Vdata is the voltage of the data signal supplied from the data signal terminal Data. VDD" is a voltage of the electrical signal supplied from the first voltage terminal VDD.

The schematic description is made in the above embodiments in the example where the transistors included in the circuit structures are all P-type transistors.

In some other embodiments, in the case where the transistors included in the circuit structures are all N-type transistors, the N-type transistors may be turned on under the control of the high level signal.

For example, in the light-emitting phases (including the first light-emitting phase P3 and the second light-emitting phase P5), the level of the enable signal supplied from the enable signal terminal EM is a high level, e.g., the voltage of the enable signal is 7V. The level of the second reset signal supplied from the second reset signal terminal Reset2 is a low level, e.g., the voltage of the second reset signal is −7V. The level of the first reset signal supplied from the first reset signal terminal Reset1 is a low level, e.g., the voltage of the first reset signal is −7V. The level of the scan signal supplied from the first scan signal terminal Gate1 is a low level, e.g., the voltage of the scan signal is −7V. The level of the gate scan signal supplied from the second scan signal terminal Gate2 is a low level, e.g., the voltage of the scan gate signal is −7V. The enable signal terminal EM is further used as the first control signal terminal Con1.

The first transistor group T1 is turned off under the control of the low level signal transmitted from the first scan signal terminal Gate1, and the voltage of the fourth node N4 is pulled down due to the coupling effect of the capacitor Cgs or the capacitor Cgd. In this case, the adjustment sub-circuit 30 pulls up the voltage of the fourth node N4 under the control of the signal(s) from the at least one control terminal Con to reduce the voltage difference between the first node N1 and the fourth node N4, so that the voltage of the fourth node N4 is equal to or substantially equal to the voltage of the first node N1. Thus, the potential stability of the first node N1 may be improved, so that the luminance retention of the light-emitting device 300 in the frame is high, thereby reducing the screen flicker phenomenon of the display panel 1000.

Beneficial effects that can be achieved by the display panel 1000 provided in the present disclosure are the same as the beneficial effects that can be achieved by the pixel circuit provided in the above embodiments, and will not be repeated here.

The foregoing descriptions are merely specific implementation manners of the present disclosure, but the protection scope of the present disclosure is not limited thereto. Any change or replacement within the technical scope of the present disclosure shall be included in the protection scope of the present disclosure. Therefore, the protection scope of the present disclosure shall be subject to the protection scope of the claims.

What is claimed is:

1. A display panel, comprising:

a plurality of pixel circuits; and light-emitting devices electrically connected to the pixel circuits; wherein each pixel circuit of the plurality of pixel circuits comprises a driving sub-circuit, a compensation sub-circuit, an adjustment sub-circuit and a writing sub-circuit, wherein the driving sub-circuit is coupled to a first node, a second node and a third node; the driving sub-circuit is configured to, in a writing phase, transmit a voltage from the second node to the third node under a control of a voltage of the first node;

the writing sub-circuit is coupled to the second node, a second scan signal terminal and a data signal terminal; the writing sub-circuit is configured to: in the writing phase, transmit a data signal received at the data signal terminal to the second node under a control of a gate scan signal received from the second scan signal terminal; and in an adjustment phase, transmit the data signal received at the data signal terminal to the second node under the control of the gate scan signal received from the second scan signal terminal, so as to reset the second node;

the compensation sub-circuit is coupled to the first node, the third node and a first scan signal terminal; the compensation sub-circuit is configured to: in an initialization phase, transmit the voltage of the first node to the third node under a control of a scan signal transmitted from the first scan signal terminal; and in the writing phase, transmit a voltage of the third node to the first node under the control of the scan signal transmitted from the first scan signal terminal; wherein the compensation sub-circuit includes a first transistor group, and the first transistor group includes at least two first transistors connected in series; and gates of all the first transistors in the first transistor group are coupled to the first scan signal terminal, a first electrode of a first first transistor in the first transistor group is coupled to the first node, and a second electrode of a last first transistor in the first transistor group is coupled to the third node; a fourth node is formed between a second electrode of the first first transistor in the first transistor group and a first electrode of a second first transistor in the first transistor group; and the adjustment sub-circuit is coupled to the fourth node and at least one control terminal; the adjustment sub-circuit is configured to, in light-emitting phases, adjust a voltage of the fourth node under a control of a signal from the at least one control terminal, so as to reduce a voltage difference between the fourth node and the first node;

wherein the display panel further comprises:

a substrate and a first gate conductive layer located on a side of the substrate, wherein the first gate conductive layer includes an enable signal line extending in a first direction; the adjustment sub-circuit includes a second transistor, and the enable signal line includes at least a third portion; the third portion is further used as a gate of the second transistor; and a second gate conductive layer located on a side of the first gate conductive layer away from the substrate and a first source-drain conductive layer located on a side of the second gate conductive layer away from the substrate, wherein the first source-drain conductive layer includes reference voltage lines extending in a second direction; the second direction and the first direction intersect;

an orthographic projection of a reference voltage line on the substrate is at least partially overlapped with an orthographic projection of the gate of the second transistor on the substrate; and an overlapping area of the orthographic projection of the reference voltage line on the substrate and an orthographic projection of the fourth node on the substrate is less than 50% of an area of the orthographic projection of the fourth node on the substrate; or wherein the display panel further comprises:

the substrate and the first gate conductive layer located on the side of the substrate, wherein the first gate conductive layer includes the enable signal line extending in the first direction; the adjustment sub-circuit includes the second transistor; the pixel circuit further includes a fourth transistor and a fifth transistor; a gate of the fourth transistor is coupled to an enable signal terminal, a first electrode of the fourth transistor is coupled to a first voltage terminal, and a second electrode of the fourth transistor is coupled to the second node; a gate of the fifth transistor is coupled to the enable signal terminal, a first electrode of the fifth transistor is coupled to the third node, and a second electrode of the fifth transistor is coupled to a light-emitting device; and the enable signal line includes the third portion, a fourth portion and a fifth portion; the third portion is further used as the gate of the second transistor, the fourth portion is further used as the gate of the fourth transistor, and the fifth portion is further used as the gate of the fifth transistor; wherein the gate of the second transistor is located on a side of the gate of the fifth transistor away from the gate of the fourth transistor; and the second gate conductive layer located on the side of the first gate conductive layer away from the substrate and the first source-drain conductive layer located on the side of the second gate conductive layer away from the substrate, wherein the first source-drain conductive layer includes the reference voltage lines extending in the second direction; the second direction and the first direction intersect;

the orthographic projection of the reference voltage line on the substrate is at least partially overlapped with the orthographic projection of the gate of the second transistor on the substrate;

the overlapping area of the orthographic projection of the reference voltage line on the substrate and the orthographic projection of the fourth node on the substrate is less than 50% of the area of the orthographic projection of the fourth node on the substrate.

2. The display panel according to claim 1, wherein the pixel circuit further includes the fifth transistor; the gate of the fifth transistor is coupled to the enable signal terminal, the first electrode of the fifth transistor is coupled to the third node, and the second electrode of the fifth transistor is coupled to the light-emitting device; the reference voltage line includes a first body portion and a second body portion each extending in the second direction;

the reference voltage line further includes a first connection portion connected between the first body portion and the second body portion and extending in the first direction; an orthographic projection of an end of the first connection portion on the substrate is overlapped with the orthographic projection of the gate of the second transistor on the substrate, and an orthographic projection of another end of the first connection portion on the substrate is overlapped with an orthographic projection of the gate of the fifth transistor on the substrate.

3. The display panel according to claim 1, wherein the first source-drain conductive layer further includes a first connection line;

the first electrode of the second transistor is coupled to the reference voltage line; the second electrode of the second transistor is coupled to the fourth node through the first connection line;

the reference voltage line is bent in the first direction, so that the orthographic projection of the reference voltage line on the substrate is non-overlapped with an orthographic projection of the first connection line on the substrate.

4. The display panel according to claim 1, wherein the driving sub-circuit includes a driving transistor; and the pixel circuit further includes a second capacitor, and an upper electrode plate of the second capacitor is coupled to a first voltage terminal, and a lower electrode plate of the second capacitor is coupled to the first node;

the first gate conductive layer further includes second electrode plates; a second electrode plate is the lower electrode plate of the second capacitor, and is further used as a gate of the driving transistor;

the gate of the driving transistor is coupled to the first node, and a first electrode of the driving transistor is coupled to the second node;

the first source-drain conductive layer further includes first voltage signal lines extending in the second direction; the pixel circuit further includes a fourth transistor; a gate of the fourth transistor is coupled to an enable signal terminal, a first electrode of the fourth transistor is coupled to the first voltage terminal, and a second electrode of the fourth transistor is coupled to the second node;

an orthographic projection of a first voltage signal line on the substrate is at least partially overlapped with an orthographic projection of the gate of the driving transistor on the substrate, and is at least partially overlapped with an orthographic projection of the gate of the fourth transistor on the substrate.

5. The display panel according to claim 4, wherein the second gate conductive layer includes first electrode plates and shielding portions;

a first electrode plate is the upper electrode plate of the second capacitor; an orthographic projection of the first electrode plate on the substrate is partially overlapped with an orthographic projection of the second electrode plate on the substrate;

an orthographic projection of a shielding portion on the substrate is partially overlapped with an orthographic projection of the second node on the substrate; and the shielding portion is electrically connected to the first voltage signal line, and the shielding portion and the first electrode plate are of an integral structure.

6. The display panel according to claim 1, further comprising a second source-drain conductive layer located on a side of the first source-drain conductive layer away from the substrate; wherein the second source-drain conductive layer includes data signal lines extending in the second direction;

a reference voltage line and a data signal line that are connected to a same column of pixel circuits are respectively located on two sides of a first voltage signal line that is connected to the same column of pixel circuits;

the second source-drain conductive layer further includes shielding members, and a shielding member is connected to the first voltage signal line; an orthographic projection of the shielding member on the substrate is overlapped with an orthographic projection of the first node on the substrate.

7. The display panel according to claim 1, wherein the driving sub-circuit includes a driving transistor; a gate of the driving transistor is coupled to the first node, a first electrode of the driving transistor is coupled to the second node, and a second electrode of the driving transistor is coupled to the third node; and/or the writing sub-circuit includes a third transistor; a gate of the third transistor is coupled to the second scan signal terminal, a first electrode of the third transistor is coupled to the data signal terminal, and a second electrode of the third transistor is coupled to the second node; and/or the pixel circuit further comprises an energy storage sub-circuit; wherein the energy storage sub-circuit includes a second capacitor; a first electrode of the second capacitor is coupled to a first voltage terminal, and a second electrode of the second capacitor is coupled to the first node; the energy storage sub-circuit is configured to store and maintain the voltage of the first node.

8. The display panel according to claim 1, wherein the pixel circuit further comprises a first reset sub-circuit and a second reset sub-circuit; wherein the first reset sub-circuit is coupled to a first reset signal terminal, a first initialization signal terminal and the first node; the first reset sub-circuit is configured to transmit an initialization signal received at the first initialization signal terminal to the first node under a control of a first reset signal received from the first reset signal terminal; and the second reset sub-circuit is coupled to a second reset signal terminal, and a second initialization signal terminal, and is configured to be coupled to a light-emitting device; the second reset sub-circuit is configured to transmit an initialization signal received at the second initialization signal terminal to the light-emitting device under a control of a second reset signal received from the second reset signal terminal.

9. The display panel according to claim 8, wherein the first reset sub-circuit includes a sixth transistor; a gate of the sixth transistor is coupled to the first reset signal terminal, a first electrode of the sixth transistor is coupled to the first initialization signal terminal, and a second electrode of the sixth transistor is coupled to the first node; or the first reset sub-circuit includes a sixth transistor group; the sixth transistor group includes at least two sixth transistors connected in series; gates of all the sixth transistors in the sixth transistor group are coupled to the first reset signal terminal, a first electrode of a first sixth transistor in the sixth transistor group is coupled to the first initialization signal terminal, and a second electrode of a last sixth transistor in the sixth transistor group is coupled to the first node.

10. The display panel according to claim 8, wherein the second reset sub-circuit includes a seventh transistor; a gate of the seventh transistor is coupled to the second reset signal terminal, a first electrode of the seventh transistor is coupled to the second initialization signal terminal, and a second electrode of the seventh transistor is coupled to the light-emitting device; and/or the second scan signal terminal and the second reset signal terminal respond to a control of a same control signal.

11. The display panel according to claim 1, wherein the pixel circuit further comprises a light-emitting control sub-circuit; wherein the light-emitting control sub-circuit is coupled to a first voltage terminal, an enable signal terminal, the second node, and the third node, and is configured to be coupled to a light-emitting device; the light-emitting control sub-circuit is configured to transmit, under a control of a signal from the enable signal terminal, a driving signal to the light-emitting device in cooperation with the driving sub-circuit.

12. The display panel according to claim 11, wherein the light-emitting control sub-circuit includes a fourth transistor and a fifth transistor;

a gate of the fourth transistor is coupled to the enable signal terminal, a first electrode of the fourth transistor is coupled to the first voltage terminal, and a second electrode of the fourth transistor is coupled to the second node; and a gate of the fifth transistor is coupled to the enable signal terminal, a first electrode of the fifth transistor is coupled to the third node, and a second electrode of the fifth transistor is coupled to the light-emitting device.

13. The display panel according to claim 11, wherein the at least one control terminal includes a first control signal terminal, and the enable signal terminal and the first control signal terminal respond to a control of a same control signal; or the at least one control terminal includes a second control signal terminal and a reference voltage terminal, and the enable signal terminal and the second control signal terminal respond to a control of a same control signal.

14. The display panel according to claim 1, wherein the first gate conductive layer further includes a second scan signal line extending in a first direction;

the writing sub-circuit includes a third transistor, and the pixel circuit further includes a seventh transistor, and a gate of the seventh transistor is coupled to a second reset signal terminal, a first electrode of the seventh transistor is coupled to a second initialization signal terminal, and a second electrode of the seventh transistor is configured to be coupled to a light-emitting device;

the second scan signal line includes at least a first portion and a second portion;

the first portion is further used as a gate of the third transistor, and the second portion is further used as the gate of the seventh transistor.

* * * * *